United States Patent [19]

Palmer et al.

[11] Patent Number: 5,748,973
[45] Date of Patent: May 5, 1998

US005748973A

[54] ADVANCED INTEGRATED REQUIREMENTS ENGINEERING SYSTEM FOR CE-BASED REQUIREMENTS ASSESSMENT

[75] Inventors: James D. Palmer; Richard P. Evans, both of Fairfax County, Va.

[73] Assignee: George Mason University, Fairfax, Va.

[21] Appl. No.: 275,422

[22] Filed: Jul. 15, 1994

[51] Int. Cl.$^6$ .................................................. G06F 17/27
[52] U.S. Cl. ...................... 395/759; 395/701; 395/708; 395/761; 395/792
[58] Field of Search .................... 364/419.01, 419.08, 364/419.13, 419.19; 395/12, 76, 919, 922, 701, 708, 751, 759, 761, 792, 793

[56] References Cited

U.S. PATENT DOCUMENTS

| | | | |
|---|---|---|---|
| 4,734,854 | 3/1988 | Afshar . | |
| 4,742,467 | 5/1988 | Messerich et al. | 395/700 |
| 4,831,525 | 5/1989 | Saito et al. . | |
| 4,949,253 | 8/1990 | Chigira et al. . | |
| 4,965,741 | 10/1990 | Winchell et al. . | |
| 5,084,813 | 1/1992 | Ono | 395/1 |
| 5,119,479 | 6/1992 | Arai et al. . | |
| 5,243,689 | 9/1993 | Yshiura et al. | 395/51 |
| 5,249,135 | 9/1993 | Fujita | 364/474.21 |
| 5,263,164 | 11/1993 | Kannady et al. | 395/700 |
| 5,295,222 | 3/1994 | Wadhwa et al. | 395/700 |
| 5,371,807 | 12/1994 | Register et al. | 382/159 |
| 5,475,587 | 12/1995 | Anick et al. | 364/419.08 |

OTHER PUBLICATIONS

"Information Refining"; *RELease 1.0;* v90 n3; p1(13); Mar. 16, 1990; Dialog: File 275, Acc#01354664.

Wolfe et al; "Computer-facilitated Qualitative Data Analysis: Potential Contributions to Management Research"; *Journal of Management;* v19 n3, p637(24); Fall 1993; Dialog: File 148, Acc#06773934.

*Primary Examiner*—Gail O. Hayes
*Assistant Examiner*—Stephen R. Tkacs
*Attorney, Agent, or Firm*—Michael Whitham

[57] ABSTRACT

An automated, user-interactive procedure is used to obtain the right statements for computer software from the user in a way in which the statements elicited from the user are free from errors due to ambiguity, conflict, redundancy, inconsistency, and the like without compromise of user intent. The advanced integrated statements engineering system (AIRES) is an integrated environment, supporting and spanning the statements engineering life cycle. Each activity in the statements engineering life cycle is supported by a set of automated CASE tools, which taken together, comprise a suite of CASE tools in the AIRES environment. A primary feature of the assessment framework is a classification ectype (CE), which is a combination of operator controlled rules and tables to represent a category within a classification structure. CE-based statements assessment (CEBRA) provides automated support techniques to "recognize" and thus categorize English text. The AIRES-CEBRA approach applies two CE forms in combination; semantic-based and syntactic-based. The semantic-based CE from includes, as elements of the rules, text attributes such as parts of speech and order and juxtaposition of terms. Successive application of a set of such rules enables the application of a wide variety of recognition techniques including sophisticated linguistic pattern matching rules as well as semantic classification principles. The syntactic CE form enables categorization without constraint of semantic content, considering only term presence or absence. The combination of the two CE forms, semantic and syntactic, significantly improves the effectiveness of the AIRES invention, over and above their significance individually to text categorization.

5 Claims, 29 Drawing Sheets

AIRES - CEBRA

CE-BASED REQUIREMENTS ASSESSMENT [CEBRA]

SELECT
| 00 | FORMATING |
| 01 | CHARACTERIZATION |
| 02 | CE CONSTRUCTION |
| 03 | CE APPLICATION AND ASSESSMENT |

Ⓗ Ⓡ Ⓘ (REL A:VER 2.0) ③   PARAMETER SETTING

FIG.18

00 FORMATING

INPUT FILE: 196  INPUTS 197  SHOW ▽  OUTPUTS 194  OUTPUT FILE:
NOTES FILE: 197  INPUT / NOTES  198                    SHOW ▽ 201

SELECT:

| 0 CHECK NUMBERING | 4 ADD ID WITH: |
| 1 ADD FILE NAME < > | 5 PREPARE FILE XXX.PRT |
| 2 ADD FILE NAME < > BY PARA | 6 JOIN MULTIPLE LINES |
| 3 ADD FILE NAME < > BY 3.4.1.x ETC. | 7 JOIN NESTED REQUIREMENTS |

STRING TYPE FOR OPTION 3: 199

RUN SENT 193    RUN PRE 193    (H)(R)(I) 190

1. <B0783> 3.4.2  THE DISPLAY FUNCTION SHALL BE PROCESSED AT A 16 Hz RATE AND SHALL FORMAT AND DISPLAY GWS DATA ON THE GMP DISPLAY GRID CONTROL PANEL (DCP). THE GMP DISPLAY CONSISTS OF A MICROPROCESSOR BASED, 508 508 PIXEL PLASMA DISPLAY WITH A TOUCH PANEL OVERLAY AND 40 BEZEL BUTTONS (BFK'S) THAT SHALL PROVIDE THE MEANS OF INPUTTING DATA AT THE CONSOLE (REFER TO FIGRE 3-15A, 1). MDF SHALL PLOT LABELED BUTTONS ON THE DCP TO PROVIDE FOR OPERATOR INPUT (SEE FIGURE 3-15A, 2). SUCH DISPLAYS SHALL CONSIDER THE SIZE AND POSITIONING OF THE INDIVIDUAL TOUCH PANEL ELEMENTS SO THAT TOUCH PANEL ELEMENT ACTIVATION SHALL PROVIDE UNAMBIGUOUS INPUTS TO THE CONTROL

FIG.19

01 CHARACTERIZATION

SELECT
- 01-1 SYNTACTIC CHARACTERIZATION AND RELATIVE SIZING
- 01-2 TERM CHARACTERIZATION AND ID SIMILARITY COEFFICIENTS (SCs)
- 01-3 COMPARISONS

FIG.20

01-1A RELATIVE SIZING AND SYNTACTIC TOTALS

INPUTS  OUTPUTS

SHOW ▽    SHOW ▽

REQUIREMENT FILE      : b0783    req         .sty    .sty
STEMMING FILE         : bstem-0  xstem-x     .sen    .sen
NO-STEMWORD FILE      : bstem-0  xnstem-x    .tot    .tot
FILE LIST (FOR totc)  :          File list   .tots   .tots
NOTES FILE            :          notes       .totc   .totc
                                              .nsty   .nsty LOC: 10
FP : 10     INSERT REQUIREMENT IDs? N Y

SELECT:

| NO STEM | STEM4 |
| STEM1   | STEM5 |
| STEM2   | STEM6 |
| STEM3   |       |

(RUN sty) (RUN sen) (RUN totc)
(RUN ala) (RUN alp) (RUN allr)

211

(H) (R) (I)

1  adj    1.
1  adj    b0783
1  noun   3.4.2
1  art    the
1  adj    Display
1  noun   function
1  aux    shall
1  be     be
1  verb   processed

01-3A FILE COMPARISONS – SYNTACTIC ELEMENTS

INPUTS

COMPARISON LIST : bcomp-4  [comp-x] SHOW ▽

NOTES FILE : _____  [notes]

SELECT TYPE OF DATA TO BE COMPARED:

| adja | adva | cson |
|------|------|------|
| csonp | cvon | cvonp |
| cvson | cvsonp | nalp |
| natot | nvaatot | nvtot |
| obn | obnp | sun |
| sunp | valp | vatot |

OUTPUTS

MATCHED DATA : [.mxxxa] SHOW ▽
              [.mxxxp]

UNMATCHED DATA IN EACH
REQUIREMET FILE : [req]
                  [.nxxxa]
                  [.nxxxr]

( RUN comp )     ( H ) ( R ) ( I )

--- adja compare of: b0781  b0783

| Document | word | ID |
|----------|------|----|
| b0781 | 1. | 1 |
| b0783 | 1. | 1 |
| b0781 | 16 | 1 |

02-1C REPLACEMENT SYNONYMS

INPUTS  (SHOW ▽)

INPUT REQUIREMENT FILE : B0783         REQ   XSYNR-X
REPLACEMENT SYNONYM FILE: BSYN-23      NOTES
NOTES FILE               :

OUTPUTS  (SHOW ▽)

OUTPUT FILE:    XSYNR-X (RUN SYNR)   (H) (R) (I)

1. <B0783> 3.4.2  THE DISPLAY FUNCTION SHALL BE PROCESSED AT A 16 Hz RATE AND SHALL FORMAT AND DISPLAY GWS DATA ON THE GMP DISPLAY GRID CONTROL PANEL (DCP). THE GMP DISPLAY CONSISTS OF A MICROPROCESSOR BASED, 508 508 PIXEL PLASMA DISPLAY WITH A TOUCH PANEL OVERLAY AND 40 BEZEL BUTTONS (BFK'S) THAT SHALL PROVIDE THE MEANS OF INPUTTING DATA AT THE CONSOLE (REFER TO FIGRE 3-15A, 1). MDF SHALL PLOT LABELED BUTTONS ON THE DCP TO PROVIDE FOR OPERATOR INPUT (SEE FIGURE 3-15A, 2). SUCH DISPLAYS SHALL CONSIDER THE SIZE AND POSITIONING OF THE INDIVIDUAL TOUCH PANEL ELEMENTS SO THAT TOUCH PANEL ELEMENT ACTIVATION SHALL PROVIDE UNAMBIGUOUS INPUTS TO THE CONTROL FUNCTION. PANEL ELEMENT ACTIVATION SHALL GENERATE DISPLAYS CONSISTING OF VARIOUS FUNCTIONALLY DEFINED PAGES, AND THE BFK'S SHALL BE USED TO PROVIDE EASY OPERATOR SELECTION OF PAGE DISPLAYS AND DATA ENTRY AT THE CONSOLE. THIS FUNCTION SHALL DISPLAY A STATUS AREA ON ALL PAGES INDICATING THE CURRENT SYSTEM MODE, ENGAGEMENT ORDER, ALERTS, AND BALLISTICS STATUS INFORMATION (SEE FIGURE 3-15A, 3). DISPLAY PAGES

03 CE APPLICATION

SELECT
| 03-1 CE APPLICATION – WORD FORM |
| 03-2 CE APPLICATION – ID-BASED INTEGER FORM |
| 03-3 CE APPLICATION – SC-BASED INTEGER FORM |
| 03-4 CATEGORY CODE(CC) SORTING |
| 03-5 ID ASSESSMENT AND REVIEW |

FIG.25

03-1 CE Application-Word Form

INPUTS    SHOW ▽

| REQUIREMENT FILE | : b0783 | Req |
|---|---|---|
| | | .sty |
| CET-X FILE | : BCET-45 | xcet-x |
| TAB-X FILE | : | xtab-x |
| SYNONYM FILE | : | xsyn-x |
| XPRO FILE | : | xpro-x |
| NOTES FILE | : | notes |

OUTPUTS    SHOW ▽

| | | .mat2r |
|---|---|---|
| | : | .mat2i |
| | : | .mat2is |
| | : | .aclist |
| | : | .mat2t |
| | : | .mat2t.nroff |
| | : | .mout2 |
| | : | .mout2.nroff |
| | : | .out |

( RUN mat2 )  ( RUN mat2t )  ( RUN out2 )  ( RUN mat2out )    (H) (R) (I)

001. bcew-001 PSA1 100 p y y o o bsyn-1 btab-1
Grid
Control
Panel
002. bcew-002 PSA1 100 p y y o o bsyn-1 btab-1
Grid
Control

FIG.26

03-2 CE APPLICATION – ID-BASED INTEGER FORM

INPUTS

| | | |
|---|---|---|
| REQUIREMENT FILE | : bcomp-4 | |
| .clist-x FILE | : .clist-1 | |
| xcet-x FILE | : xcet-45 | |
| .mat2i FILE | : | |
| .mat2r FILE | : | |
| .mat2is FILE | : | |
| NOTES FILE | : | |
| SC THRESHOLD % | : 100     0 | |

SHOW ▽ req
.clist-x
xcet-x
mat2i
mat2r
mat2is
notes

SAVE AS : _____ □ 100

(SAVE clist-x)

(SHOW .aclist)

OUTPUTS xxx.vtc-x  : bvtc-4
xxx.vtc-x.mat3 :

SHOW ▽ xxx.vtc-x
xxx.vtc-x.mat3

(BUILD vtc) (RUN mat3)
(H) (R) (I)

28

001.003.or.
001.002.not.
001.003.and.
002.001.not
003.001.not.
001.cf.
e
a01.106.or.
a0i.a06.and.
e

O3-3 CE APPLICATION – SC-BASED INTEGER FORM

INPUTS

SHOW ▽

| req |
|-----|
| .sco |

REQUIREMENT FILE : b0783

| .arr |
| xcec-x |
| xrec-x |
| notes | xcec-x FILE : bcec-2
xrec-x FILE :
NOTES FILE :

OUTPUTS

SHOW ▽

| .mat4r |
| .mat4i |
| .mat4 |
| .mout4 |

.mat4r :
.mat4i :
.mat4 :
.mout4 :

(H) (R) (I)

RUN mat4

ADVANCED INTEGRATED REQUIREMENTS ENGINEERING SYSTEM FOR CE-BASED REQUIREMENTS ASSESSMENT

DESCRIPTION

BACKGROUND OF THE INVENTION

1. Field of the Invention

The present invention generally relates to English language categorization tools and, more particularly, to a text categorization system that was initially designed to support the categorization of English language requirements used for system development. For that reason it was named as an advanced integrated requirements engineering system for CE-based requirements assessment (AIRES-CEBRA). In its initial form the invention was directed to the categorization of English language requirements for system development. When the invention was consummated, it was evident that it has applicability to the problem of categorization of English text without regard to the specific use or purpose of that text. The invention is specifically directed to a system that provides automated support for the categorization of English language text by quantifiable conditions.

2. Description of the Prior Art

There are extensive computer-aided systems for indexing documents, as in support of library science. There are also many tools for text searching. A prime example of the latter is the TRW and Britton-Lee IDM-500 system that is designed to rapidly search extremely large databases of English material for designated strings of text by use of special hardware algorithms. There is also an extensive array of tools that support system development when manually-categorized text is applied. These tools support various development tasks including storage and retrieval of the categorized text, simulations of the expected system operation, and transforms of the informal English text to more formal design-enabling representations that are both graphical as well as English in a restricted syntax and vocabulary.

There are no known computer-aided systems for categorization of English language statements by quantifiable conditions. Categorization of English text is a necessary activity in many fields of endeavor. It is particularly necessary in the process of system development. Uses of categorizations as part of system development, for example, include:

tracing between top level and subordinate documentation to assure complete lower-level implementation, tracing between requirements and test cases, measuring compliance between a request for a proposal and a response, estimating the relative size of the development effort to be needed for selected sets of systems requirements, establishing text-based risk metrics, determining impacts (traces) of requirements change(s), identifying possible issues and deficiencies including ambiguity, conflict, redundancy, inconsistency, imprecision, and inexactness, and extracting requirements associated with changes in system state for dynamic or real-time systems.

Similar examples of the need for categorizations of English text could also be stated for areas other than system development.

In the arena of systems development, as an example area, there are many CASE (Computer Aided Systems Engineering) tools that use manually prepared categorizations of English language requirements. But there are no known tools to provide automated support to the categorization of English text by quantifiable conditions.

Manual-only processes for categorization of English text have several attendant problems. Primary among these are the process is not repeatable; it is error prone; its resource consumption in staff days is high (staff days and weeks for as few as a thousand separate statements); the process is not assuredly comprehensive; once effected, the process has to be repeated in its entirety for even one change, especially when traces are the objective; and manual-only processes are binary (i.e., in or out, yes or no), whereas quantifiable conditions cannot be applied to generate a composite score as a metric on the degree of match of a given statement with a designated category, thus generation of lists of candidates for a given category, listed by decreasing composite categorization scores, are not available for review and decision by others. Sets of sub-categories cannot be applied in logical operations of "AND", "OR", "NOT", and "Exclusive OR" in a hierarchy of quantified conditions to determine the composite score. Both syntactic (word presence regardless of meaning or the context in which it is used) and semantic (established meaning or context usage of the word or sets of words) conditions cannot be applied in concert. The process does not support sensitivity analyses to assess variations in candidate categorization lists with changes in the quantifiable conditions, including conditions that apply logical operations among sub-categories. The conditions for definition of a given category are not established in advance and controllable, each new statement and pair of statements is, in a manual review, of necessity considered by a freshly formed algorithm or set of conditions. What is needed is a system to provide automated support for the categorization of English text that overcomes these problems.

SUMMARY OF THE INVENTION

It is therefore an object of the present invention to provide automated support for the categorization of English text by quantifiable conditions.

The invention achieves the objective by the use of classification ectypes (CEs). An ectype is a representation, and CEs are representations of English language categories. CEs are text-edited files containing the quantified conditions (rules and tables) for a given category. Sets of CEs are used as master CEs. Sets of master CEs are employed in CE Procedures or CEPs. Aggregates of CEPs are designated meta CEPs. The advanced integrated requirements engineering system (AIRES) according to the invention is an integrated environment, supporting and spanning the requirements engineering life cycle. The invention specifically is an implementation of CE-based requirements assessment (CEBRA) which provides automated support to categorize English text by quantifiable conditions. AIRES-CEBRA applies two CE forms in combination; semantic-based and syntactic-based. The semantic-based CE form includes, as elements of the rules, meaning or context of words, text attributes such as parts of speech and order and juxtaposition of terms. Successive application of a set of such rules enables the application of a wide variety of categorization techniques including sophisticated linguistic pattern matching rules as well as semantic classification principles. The syntactic CE form enables categorization without constraint of semantic content, considering only term presence or absence. AIRES-CEBRA CEs also uses weighted word files, weighted files for synonyms and other knowledge representations such as "parts-of", and "uses", stemming programs, and no-stem files.

The invention, in its preferred implementation, is practiced on a workstation such as a Sun, IBM or HP/Apollo workstation. Such workstations typically have a reduced instruction set computer (RISC) microprocessor and run a version of the Unix® operating system (OS) supporting a windowing graphical user interface (GUI) such as X-Windows or Motif. The specific application modules which comprise the invention are preferably written in the C and C++ computer languages, the latter being an object oriented programming (OOP) language. However, the practice of the invention is not limited to such workstations and may be run on other and different computers and operating systems, and the specific implementation of the application modules described may be realized in other programming languages including, for example, Object Pascal written for the Apple Macintosh® computer.

BRIEF DESCRIPTION OF THE DRAWINGS

The foregoing and other objects, aspects and advantages will be better understood from the following detailed description of a preferred embodiment of the invention with reference to the drawings, in which:

FIG. 18 is a facsimile of a computer display screen showing the basic menu panel allowing the operator to select from among the four modules of the AIRES-CEBRA assessment framework shown in FIG. 2; and FIG. 19 is a facsimile of a computer display screen showing an example of an operator execution panel for the formatting module in the AIRES-CEBRA system;

FIG. 20 is a facsimile of a computer display screen showing a submenu allowing the operator additional options when the characterization module is selected from the menu of FIG. 18;

FIG. 21 is a facsimile of a computer display screen showing an example of an operator execution panel for the relative sizing and syntactic totals used in characterizing requirements;

FIG. 23 is a facsimile of a computer display screen showing an example of an execution panel presented to the operator as one of the options when the third option of the submenu shown in FIG. 20 is selected;

FIG. 24 is a facsimile of a computer display screen showing an example of an execution panel when the CE construction option is selected from the menu shown in FIG. 18;

FIG. 25 is a facsimile of a computer display screen showing a submenu allowing the operator additional options when the CE application module is selected from the menu of FIG. 18;

FIG. 26 is a facsimile of a computer display screen showing an example of an execution panel when the first option of the submenu shown in FIG. 25 is selected;

FIG. 27 is a facsimile of a computer display screen showing an example of an execution panel when the second option of the submenu shown in FIG. 25 is selected;

FIG. 28 is a facsimile of a computer display screen showing an example of an execution panel which is displayed when the build VTC button on the panel shown in FIG. 27 is selected; and FIG. 29 is a facsimile of a computer display screen showing an example of an execution panel when the third option of the submenu shown in FIG. 25 is selected.

DETAILED DESCRIPTION OF A PREFERRED EMBODIMENT OF THE INVENTION

The subject invention, termed AIRES for advanced integrated requirements engineering system CE-Based Requirements Assessment, is designed to provide automated support to the categorization of any English text by quantifiable conditions.

The support provided enables essentially untrained operators to prepare lists of candidate English statements for established categories. Those lists would include the composite score for each candidate against quantified conditions as the basis for potential membership in a given category. The conditions, applied as CEs in the invention, may be applied singly or in sets that also support logical operations of "AND", "OR", "NOT" and "Exclusive OR" among sub-categories.

Figure 1:
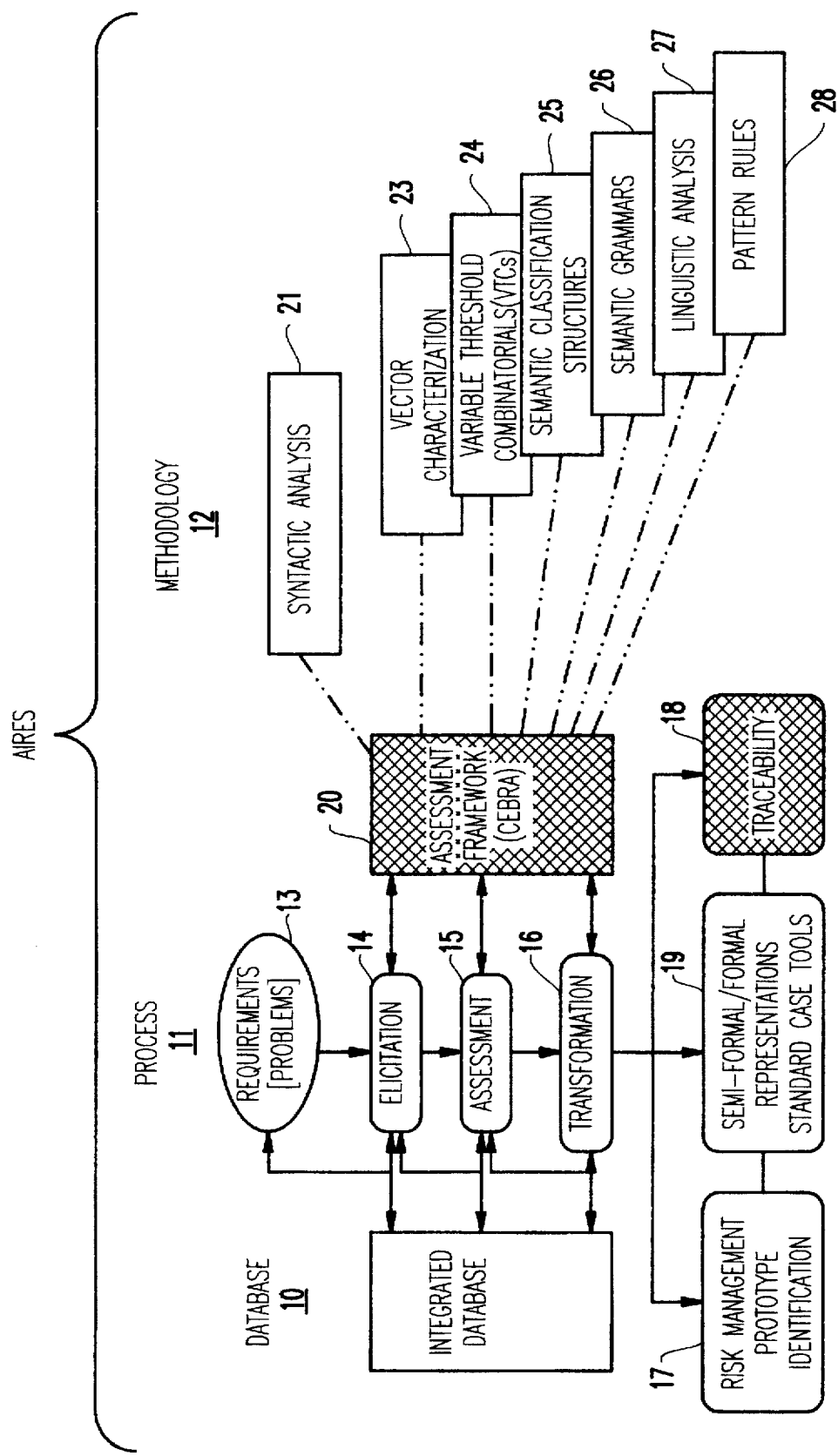
FIG. 1 is a functional block diagram showing the overall architecture of the AIRES system according to the invention.

Referring now to the drawings, and more particularly to FIG. 1, there is shown a functional block diagram of the AIRES environment supporting and spanning the requirements engineering life cycle. More specifically, AIRES comprises an integrated database 10, a process 11 and a methodology 12. There are five primary elements of the database 10. First, there is a commercially available relational database such as ORACLE that is used in the storage and retrieval of AIRES files. Second, there are ASCII (American Standard Code for Information Interchange) files of the requirements documents generated by the system developers and sponsors as the system description. Third, there are the AIRES-CEBRA generated characterization files (i.e., the characteristics of the requirements documents). Fourth, there are the operator-generated classification ectype (CE) and master CE files (and also CE procedure or CEP as well as meta-CEP files) created by use of the AIRES-CEBRA panels. Finally, there are the AIRES-CEBRA results files; that is, the results of the application of the CEs and CEPs. These results nominate identifications (IDs) for operator review and allocation to operator-designated categories. The process 11 spans the scope of the requirements engineering phase of system development 13, from elicitation 14, through assessment 15, to transformation 16. The software requirements engineering activities supported by AIRES also span a wide spectrum, including risk management and prototyping and support for preparation of prototypes 17, requirements tracing 18, to semi-formal or formal representations 19. The methodology 12 comprises the assessment framework, or AIRES-CEBRA for CE-based requirements assessment, 20 which access various tools and methods including syntactic analysis 21, classification ectypes (CEs) 22, vector characterization 23, variable threshold combinatorials (VTCs) 24, semantic classification structures 25, semantic grammars 26, linguistic analysis 27, and pattern rules 28.

The AIRES-CEBRA approach to the categorization of requirements is based on both syntactic properties and semantic characteristics and includes the following features:

use of natural language or prose statements in their original informal form and preserving these statements throughout the entire requirements engineering process to produce traceable design specifications in both forward and reverse directions;

automated support for risk detection and identification in informal prose requirements statements;

automated identification of factors such as relative sizing using informal prose requirements statements, quality factor conflict determination, and change management and maintenance through impact analysis and issue seeding due to changing requirements;

assessment directed to:

the establishment of both generic and domain specific knowledge-based requirements classification structures and associated categorization models to facilitate automated and semi-automated domain analysis, the enhancement of requirements quality by the identification of potential issues and risk attributes such as ambiguities, inconsistencies, conflicts, and redundancies, and extraction of requirements into designated categories and the identification of relative sizing to support issue identification and requirements extraction;

automated support for assignment of systems and software level validation metrics; and automated support for transformation of systems and software level validation metrics semi-formal or formal design specification languages such as entity-relationship diagrams, finite state machines, data flow diagrams, data structure diagrams, Petri Nets, or other representations.

One key feature of the AIRES-CEBRA methodology is the use of variable-thresholds as part of the classification ectype (CE) rules for representing categories. Variable thresholds allow for overlap; i.e., a given requirement many belong to more than one category. Achieving and maintaining that variable gradation while assessing the requirements to obtain the values of the risk metrics is a central feature of the approach.

Other elements of the AIRES-CEBRA methodology include (1) text-based techniques for application of requirement classification structures and categorizations in classification ectypes (CEs) that are the rules and tables of a category definition, (2) an integrated framework for establishing and implementing procedures and specific assessment products and tasks in classification ectype procedures (CEPs), (3) a method for text-based relative sizing by counts of unique syntactical elements, (4) an approach for establishment and application of weighted words and sum scores of weight combinations, (5) a mechanism for syntactic characterization of requirements that include word phrase co-occurrences, discrimination of multiple subjects and objects, part of speech such as nouns, verbs, adjectives and adverbs, and syntactic elements in other combinations, established systematically, such as noun-verb phrases, subject nouns and subject noun phrases, (6) a technique for the application of variable threshold combinatorials (VTCs) as Boolean type operations of AND, OR, NOT, and Exclusive OR in category definitions, (7) a vector characterization technique for establishing pair-wise similarity coefficients (SCs) across requirements statements, (8) an approach that includes the application of thresholds definition and identification of variable threshold categorizations, (9) a method for the generation and application of weighted thesaurus for synonyms and antonyms that either enlarge, limit, or serve as equivalents in meaning, (10) use of semantic classification structures, domain grammars, and linguistic analysis techniques for the establishment of both rules and tables for CEs, and (11) an approach that applies the definition and identification of complementary completeness.

Figure 2:
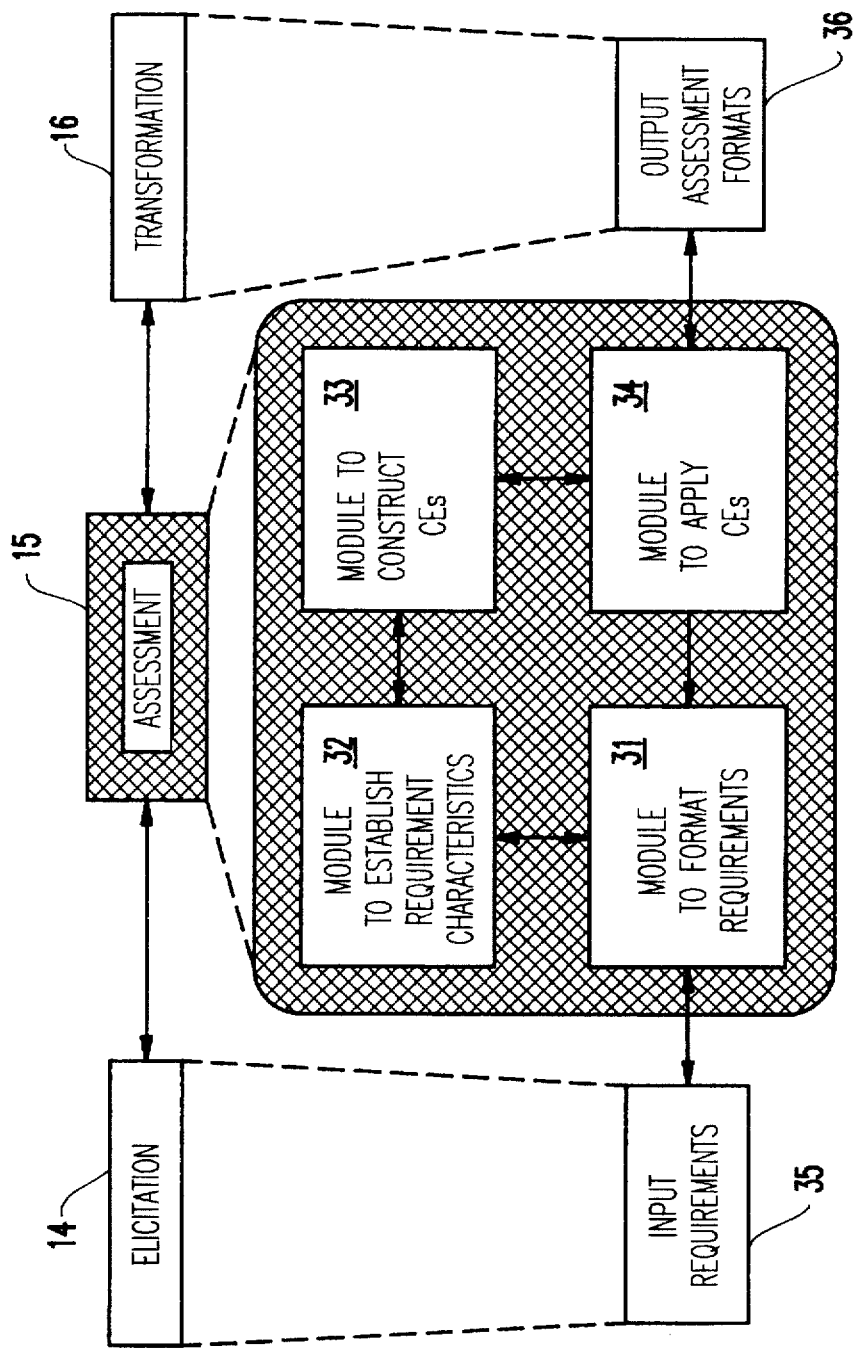
FIG. 2 is a block diagram of the assessment framework of the AIRES system.

As illustrated in FIG. 2, the AIRES-CEBRA assessment framework 20 is comprised of four integrated modules; a module 31 to format requirements, a module 32 to establish requirement characteristics, a module 33 to construct CEs, and a module 34 to apply CEs. The module 31 for formatting and identifying requirements characteristics accepts as an input the input requirements 35 which are the elicited and organized information as well as existing specifications. The approach is to take prose statements, format these if needed (without changing either the words or their meaning) to facilitate the remaining operations, and then process them to identify their characteristics. In processing the original requirements, requirements statements may be assigned identifications (IDs) in a variety of structures, with each then available for separate processing. The variation in ID structures that may be applied spans the range of each work as an ID, to individual phrases, sentences, paragraphs, pages or whole sections. The term ID is generally reserved for requirements IDs.

One of the processes in module 32 to establish requirements characteristics includes tagging words with the IDs (integers) as they were structured in the formatting module and their parts of speech. An example of the output format of that process is shown in Table 1. In that output, the original text is read from top to bottom in the "word" column.

TABLE 1

| ID | Word | Part of Speech |
| --- | --- | --- |
| 0001 | the | art |
| 0001 | trainer | noun |
| 0001 | shall | aux |
| 0001 | simulate | verb |

Other characteristics that are established and applied in the characterization module 32 include co-occurring terms, pair-wise similarity coefficients (SCs), weighted synonyms, combinations of parts of speech such as subject noun phrases and co-occurring nouns and verbs, weighted words, and stemmed words with a variety of stemming options. Additional types of characteristics span a variety of requirement risk attributes including ambiguity, conflict, imprecision, complexity, volatility, inconsistency, complementary completeness, volatility indicators (i.e., how often a requirement has been changed), primitive or original requirements such as system reports (SRs), links to requirement originators/sponsors, and traces to higher and lower level requirements. The optional use of these added characteristics, as supplementary record files, provides significant added scope to the categories that may be represented by the AIRES-CEBRA text-edited CE files.

Figure 3:
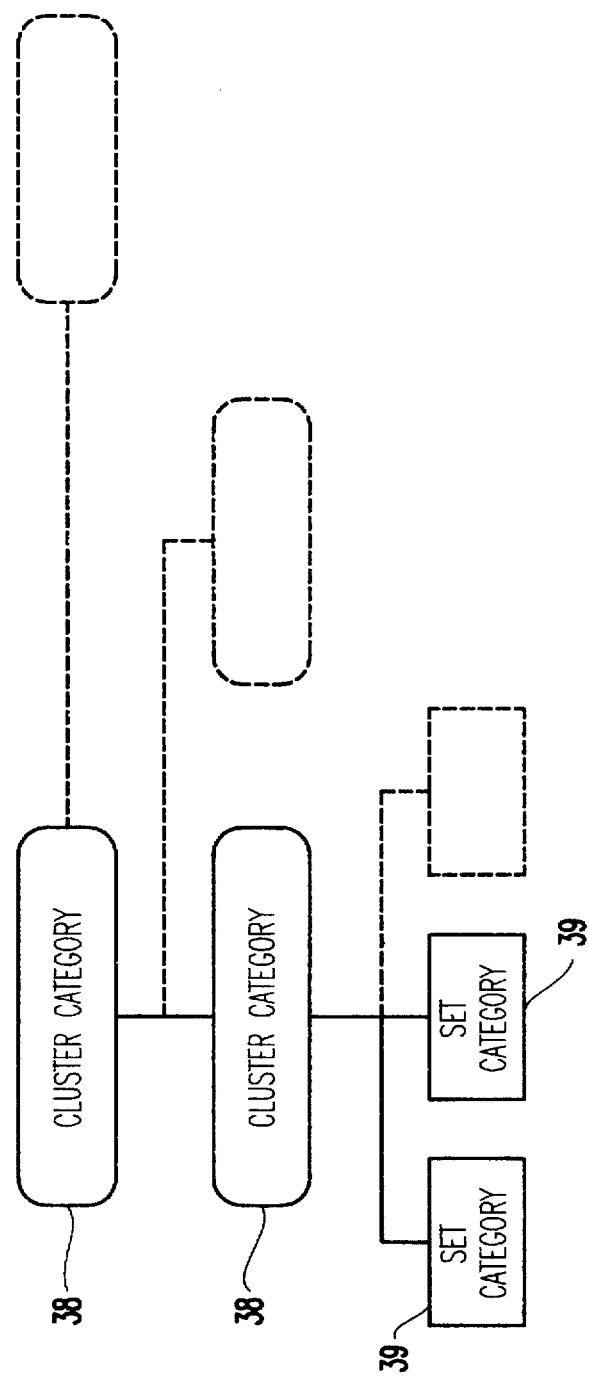
FIG. 3 is an exemplary hierarchal diagram of the risk metric classification structure and categories.

Requirements categories for risk metrics are, as illustrated in FIG. 3, defined to be elements of a classification structure. Two types of categories are used in developing a requirements-based risk metrics; intermediate categories 38 (drawn with rounded edges in FIG. 3) and set categories 39 (drawn with square edges in FIG. 3). Intermediate categories support the refining definition of the type of requirements for which the metrics are to be applied. Set categories are the basis for the requirements-based risk metrics. They are comprised of requirement risk attributes. Set categories always form the end-nodes of risk metric classification structures, but they may also be employed in a hierarchy with each other. As shown in FIG. 3, classification structures for establishing risk metrics may include intermediate as well as set categories at multiple levels of a hierarchy.

Figure 4:
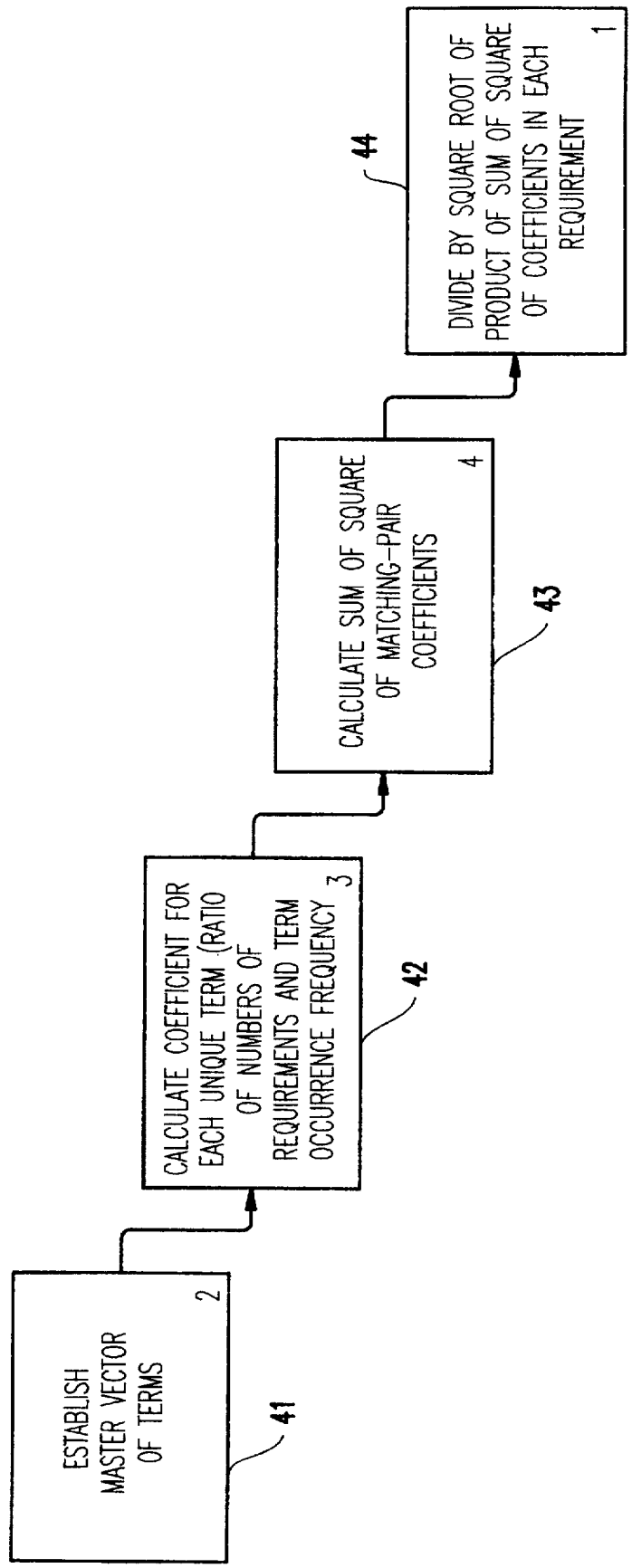
FIG. 4 is a flow diagram showing the process for the calculation of pair-wise similarity coefficients (SCs)

FIG. 4 shows the process for the calculation of pair-wise similarity coefficients (SCs). The first step 41 is to establish a master vector of terms. Then, in step 42, a coefficient is calculate for each unique term. This coefficient is the ratio of the number of requirements and term occurrence frequency. In the next step 43, the sum of squares of matching pair coefficients is calculated. Finally, in step 44, the calculated sum of squares is divided by the square root of the product of the sum of squares of coefficients in each requirement.

An operator may use many system perspectives as the basis for intermediate categories. There are likewise numerous risk attributes to be applied for set categories within each intermediate category. For example, intermediate categories may be based on such diverse views as conditional statement perspectives, functionality views, data object standpoints, or combinations of these. The numerous types of risk attributes that may be applied for set categories, such as ambiguity and imprecision, have also been noted. AIRES-CEBRA supports that need for potential categorization diversity with independent variables along seven CE construction dimensions: (1) weighted word and synonym files, (2) stemming options, (3) tables that can contain any words, singly or in phrases and sentences, paragraphs, or whole IDs, (4) numerous parameter switches in the rules, (5) variable threshold combinatorials (VTCs) that can be nested to five levels as well as iterated as needed, (6) record files of requirements attributes outside the text, such as change records, and (7) construction and use of CEs in levels in a classification structure using either differing rules and/or differing tables. The primary constraints on the scope of variation in the construction and application of CEs is in the identification of the tables; the words and phrases that, in combination with the selected rule options, characterize the views and attributes. Regardless of both the content of the CEs and classification structure where they may be used, AIRES-CEBRA establishes requirements into categories without losing information from the original requirements statements, and thus full traceability is maintained.

Referring back to FIG. 2, module 33 to construct CEs supports two forms of CEs, word from and integer form. Word form CEs are based on a list of designated words from the original statements file. Integer form CEs, using integers rather than words, are of two types, ID-based and SC-based. ID-based CEs support logical operations as the basis for categorizing statements, using the results of categorizations established by word form CEs. SC-based CEs use the pair-wise similarity coefficients (SCs) between statements. The tables for word form CEs may be specified in terms of individual words, phrases, sentences, or whole requirements statements. Examples of word form characteristics, as already noted, include co-occurring terms, weighted synonyms, weighted words, and parts of speech such as noun, verb, object noun, or combinations of those elements such as noun-verb and subject noun phrases. Other characteristics such as volatility indicators may also be cited in designated record files. The rules in word form CEs include criteria that are similarly expressed in terms of word form characteristics. The elements of word from rules include (1) percent of the words in a table that must satisfy the remaining rules, (2) proximity limits (i.e., as a contiguous phrase, within a sentence, within a paragraph, within an ID regardless of ID size, or within a specified number of words), (3) case sensitivity, (4) order of occurrence, (5) parts of speech or their combinations, (6) applicable weighted synonym list, and (7) record(s) of added characteristics, such as volatility or originator lists.

The rules and tables of ID-based integer from CEs are applied in the logical operations of AND, OR, NOT, and Exclusive OR. The rules also set a threshold for pair-wise similarity coefficients (SCs) as a measure of alikeness across statement IDs. Since the result of combining of both SC thresholds and operations is not properly called a logical operation because that does not allow for such thresholds, that combined operation is called a variable threshold combinatorial (VTC) in the AIRES-CEBRA system.

SCs are also applied in SC-based integer form rules and tables, in addition to being applied as thresholds in ID-based integer form VTC rules. SC-based integer form rules include (1) designated IDs for statements to serve as parents of an SC set, (2) the number of parents required to form a set, (3) the percent, as an entry criteria, for parents into a set, (4) similarity coefficient threshold for parents with each other, (5) order in which candidate parents are selected, either in numerical ID order or in order of SC values, and (6) redundancy policy, that is, whether a given ID may serve as a parent in more than one set. These parent type rules are similarly available in preparing SC-based CE rules for the prospective set of children.

A given category (either intermediate or set category) is seldom represented either solely by word form CEs or even a single word form and integer form CE combination. Most statement categories are represented by a combination of several CEs of all three forms; i.e., word form, ID-based integer form and SC-based integer form. The operational procedure for the application of CEs, in all their variety, is established in a text-edited CE procedure (CEP). CEPs are operator, not computer, interpreted and applied. CEs are applied to the statements files to effect the categorization process. The output of module 34 to apply CEs in FIG. 2 is an output assessment formats 36 which is used in the transformation process 16.

Figure 5:
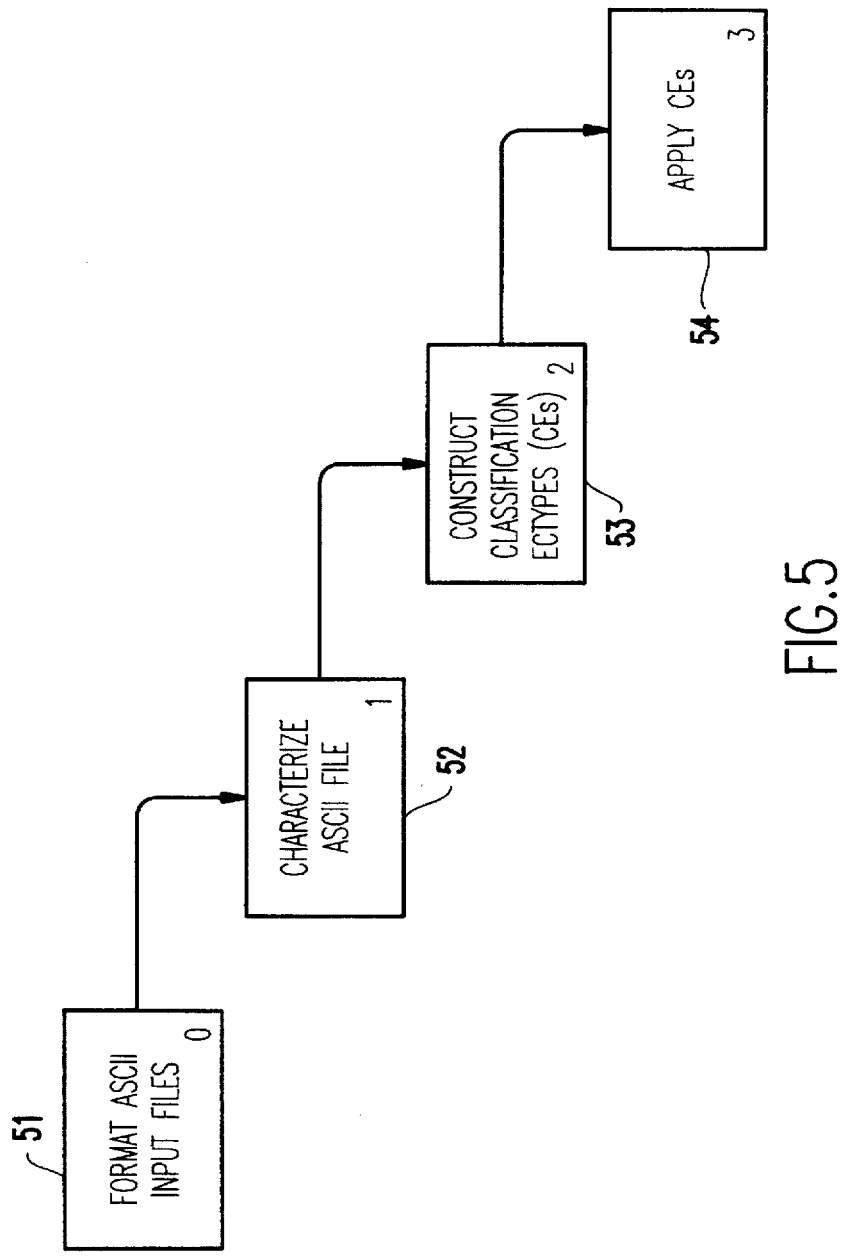
FIG. 5 is a top level flow diagram for the operation performed by the assessment framework shown in FIG. 2.

FIG. 5 is a top level flow diagram for the AIRES-CEBRA operation performed by the assessment framework 20 shown in FIG. 2. The ASCII input files are first formatted in step 51. The formatted ASCII files are characterized in step 52. The classification ectypes (CEs) are then constructed in step 53. Finally, the CEs are applied in step 54. These steps correspond to the four modules 31, 32, 33, and 34 of FIG. 2.

Figure 6:
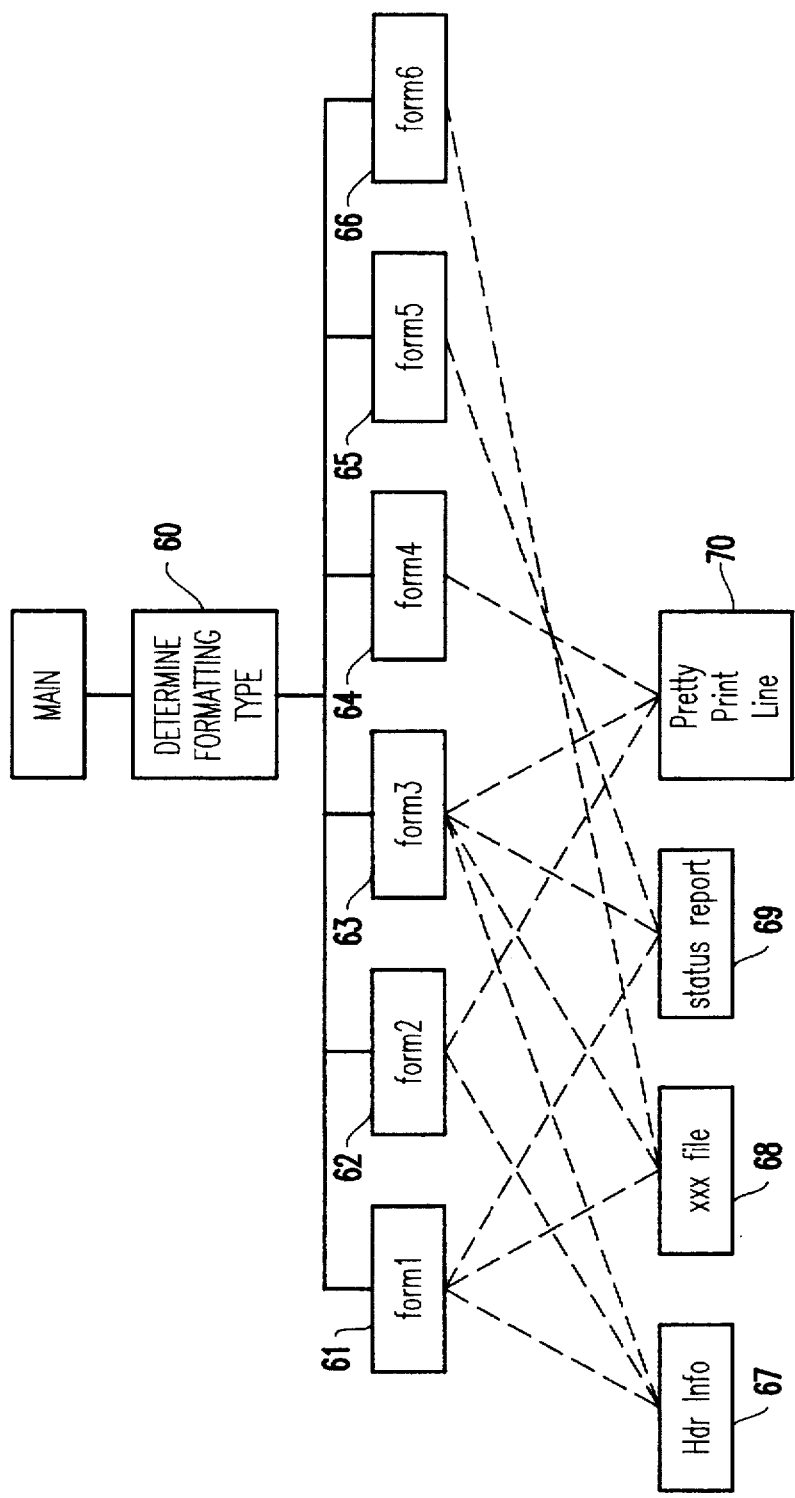
FIG. 6 is a flow diagram showing in more detail the logic of the process performed by the module to format requirements shown in FIG. 2.

The process of step 51 implemented by module 31 is shown in more detail in FIG. 6, to which reference is now made. A call is made from the main program to determine formatting type at step 60. Six switches 61 to 66 are provided for the operator, here designated as form1 through form6. In the user interactive approach implemented by the invention, the operator may select any one of these switches via a displayed panel. Selection of switch 61, form1, identifies and corrects errors introduced in conversion into ASCII files. These errors typically include separation of paragraphs and sentences. Selection of switch 62, form2, applies an operator-designated file number and a "one-up" ID as a prefix on each statement. Selection of switch 63, form 3, separates statements as designated by the operator into sentences, paragraphs and sections. Selection of switch 64, form4, separates requirements by ID in accordance with existing statement notation. (For example, the notation might be a numerical notation such as 3.5.7.1 as used in some federal government requests for proposal (RFP).) Selection of switch 65, form5, prepares the ASCII file for printing. Selection of switch 66, form6, replicates the lead-in text to bulleted and indented data to make them stand-alone meaningful statements. Selection of one of these switches will result in calling one or more procedures or files, as generally indicated by the dotted lines. For example, the procedure selected by switch 61 calls each of procedure 67, hdr info, file 68, xxx file, procedure 69, status report, and procedure 70, pretty print line. These procedures are simple routines for a specific application. For example, procedure 67, hdr info, recognizes and applies an operator-designated header page or each document printed, and procedure 69, status report, generates a statistical summary of statements.

Figure 7:
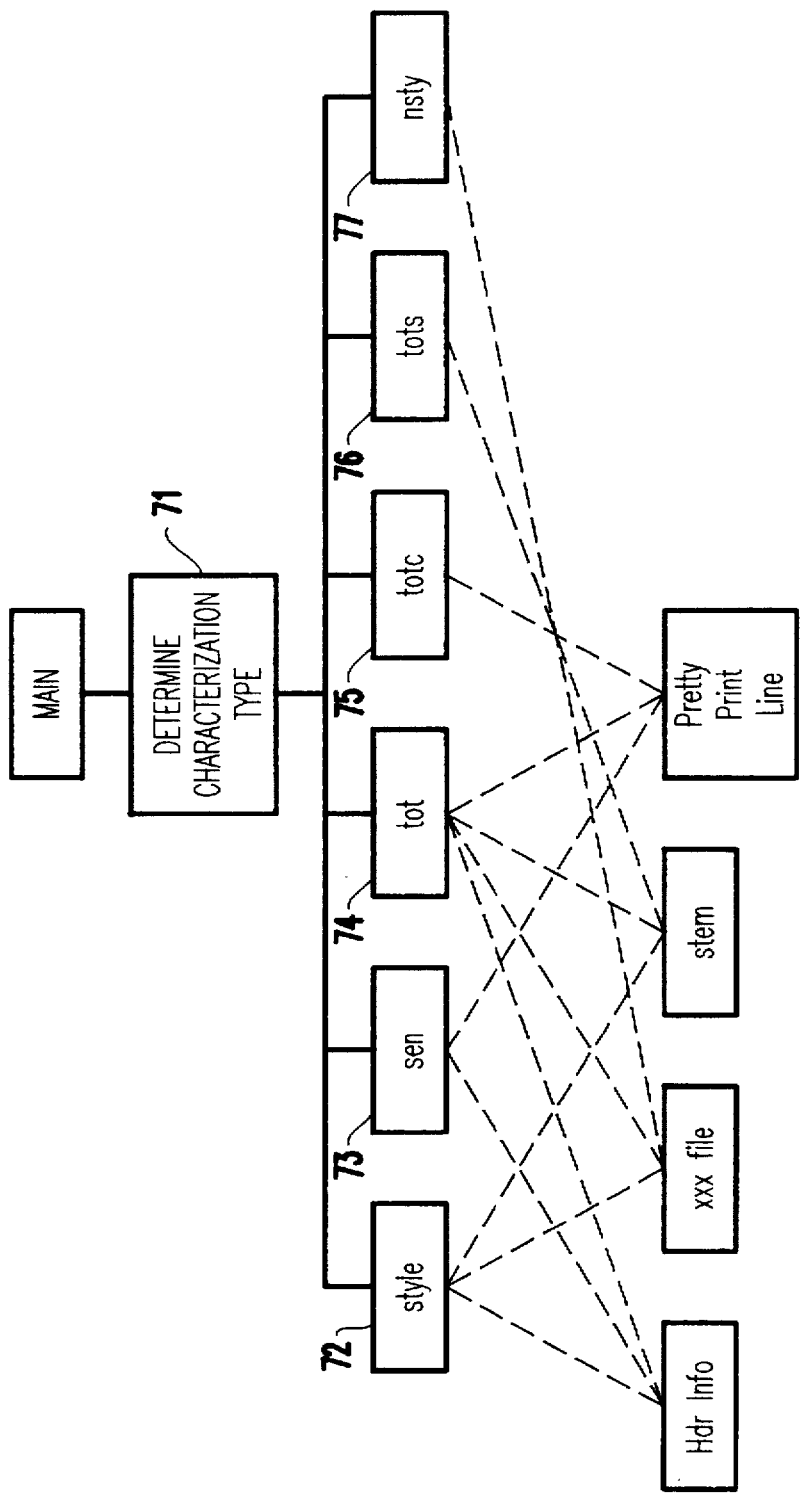
FIG. 7 is a flow diagram showing in more detail the logic of the process performed by the module to characterize requirements by syntactic elements and relative sizing shown in FIG. 2.
Figure 8:
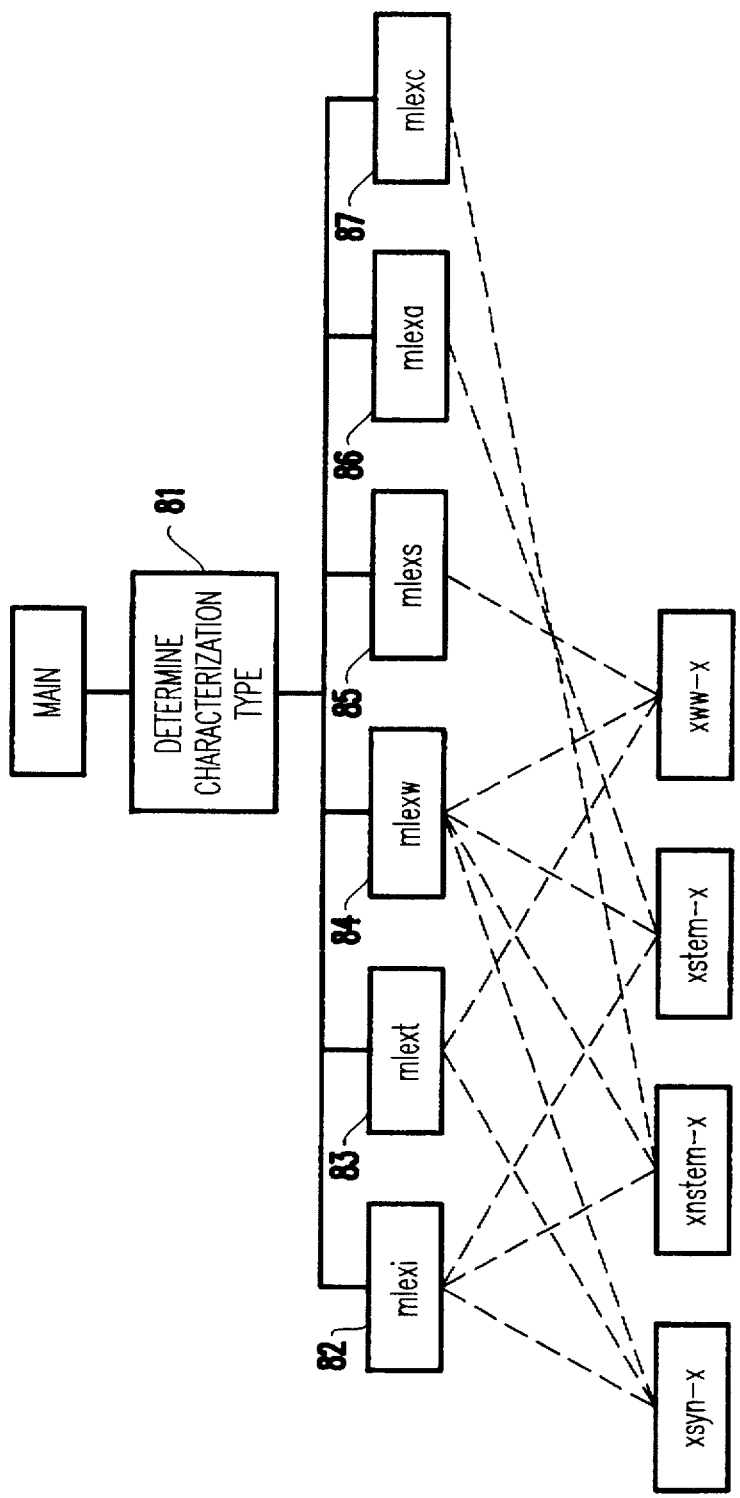
FIG. 8 is a flow diagram showing in more detail the logic of the process performed by the module to characterize requirements by term allocation and ID similarity coefficients shown in FIG. 2.

The process of step 47 implemented by module 32 is shown in more detail in FIGS. 7 and 8. Referring first to FIG. 7, there is shown the process for characterizing the statements by syntactic elements and relative sizing. A call is made from the main program to determine characterization type at step 71. Six switches 72 to 77 are provided for the operator. The operator may select any one of these switches via a displayed panel. Selection of switch 72, style, calls a commercially available program that identifies the part of speech (noun, verb, etc.) for each term. Selection of switch 73, sen, calls a commercially available program that characterizes each sentence as compound, simple, or compound-complex. Selection of switch 74, tot, calls a program that generates a statistical summary of the results of style, in individual parts of speech and fifteen combinations such as noun phrases (noun and adjective). Selection of switch 75, totc, calls a program that generates a statistical summary of the results of style, in individual parts of speech and fifteen combinations such as noun phrases as in the selection of switch 74, tot, but with a comparison of the total statistics in the context of operator designated lines-of-code and function point estimates. This provides a relative size estimation capability. Selection of switch 76, tots, calls a program that generates a statistical summary of the results of style, in individual parts of speech and fifteen combinations such as noun phrases as in the selection of switch 74, tot, but with a summary of the tot statistics in the context of operator designated lines-of-code and function point estimates. This provides a relative size estimation capability. Selection of switch 77, nsty, calls a sorted file of the style generated results, sorted by statement ID. As in the procedure for determining the formatting type shown in FIG. 6, a procedure selected by of one of the switches calls one or more procedures or files, as generally indicated by the dotted lines.

FIG. 8 shows the process to characterize statements by term allocation and ID similarity coefficients. A call is made from the main program to determine formatting type at step 80. Six switches 81 to 86 are provided for the operator. The operator may select any one of these switches via a displayed panel. Selection of switch 81, mlexi, generates a word list, the master vector of the lexicon of the statements document. Selection of switch 72, mlext, sorts the results of mlexi alphabetically. Selection of switch 73, mlexw, applies the weighted word file to remove words from the lexicon that have zero weight and apply the weights that are greater than 1.0. Selection of switch 74, mlexs, applies the operator-selected stemming program. Selection of switch 75, mlexa, calculates the similarity coefficients, as the dot product or cosine between each pair of statements. Selection of switch 76, mlexc, sorts the similarity coefficients in descending order. Selection of one of the switches calls one or more procedures, as generally indicated by the dotted lines.

Figure 9:
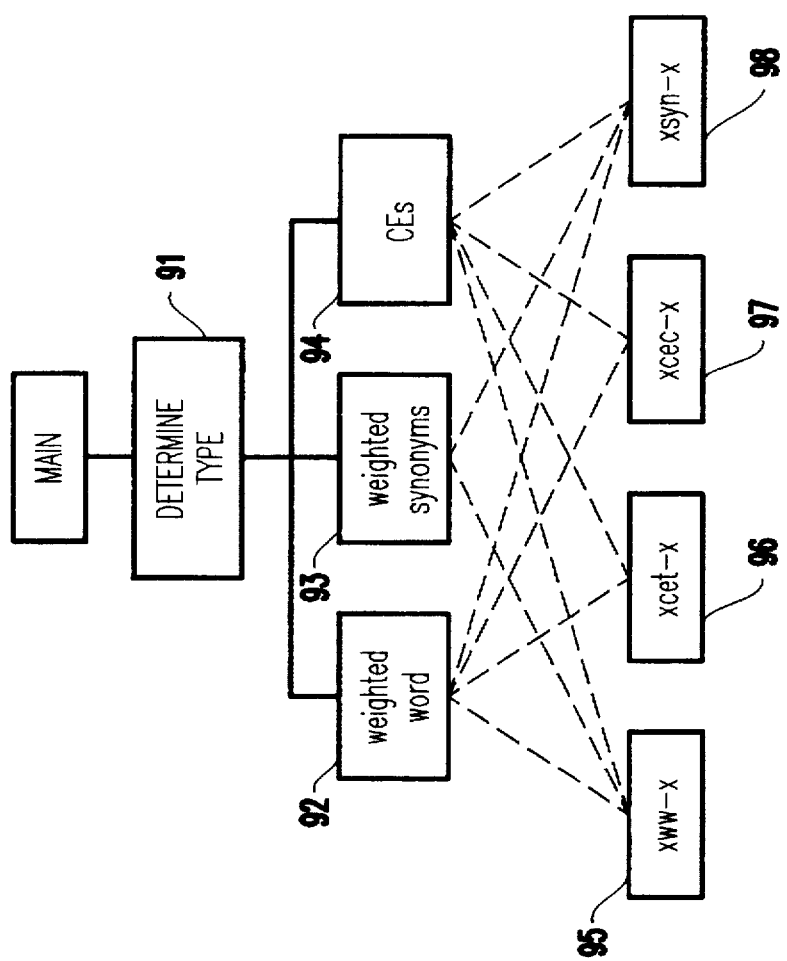
FIG. 9 is a flow diagram showing the logic of a program which is an adjunct of the process shown in FIG. 8.

FIG. 9 is a flow diagram of a weighted synonym process which is an adjunct to the process shown in FIG. 8. This set of programs applies weighted words as well as weighted synonyms and CEs. The programs in FIG. 8 use the weighted word application program. Other operations use the weighted synonyms and CEs. Thus, one set of modules are used by several other program sets. As shown in FIG. 9, a call is made from the main program to determine in step 91 the type of the part of the English language text being analyzed. The operator may select one of the switches 92, weighted words, 93, weighted synonyms, or 94, CEs. This set of programs applies weighted words 95 (xww-x), weighted synonyms 98 (xsyn-x), and CEs. The CEs are of two forms, 96 (cet-x) for "text" or word form CEs, and 97 (cec-x) for the "composite" integer form CEs; i.e., similarity coefficient or SC integers, and statement ID integers. The weighted words file, prepared by the operator, enables the designation of weights other than the default weight of 1.0. Application of a weight of 0.0 would eliminate a term from the overall document lexicon. Weights less than 1.0 but not 0.0 would deemphasize the effect of that word in calculating SCs and other categorizations. Weights greater than 1.0 emphasize those terms by that "added" weight. The weighted synonyms file enable the operator to apply a perspective to any set of synonyms by the weights applied. All weights in this field are 1.0 or less. There is no synonym that is more than a pure synonym. The CE files apply the rules and tables in the two basic forms, word form and integer form. As noted, there are two sub-forms for integers, ID integers and SC integers.

Figure 10:
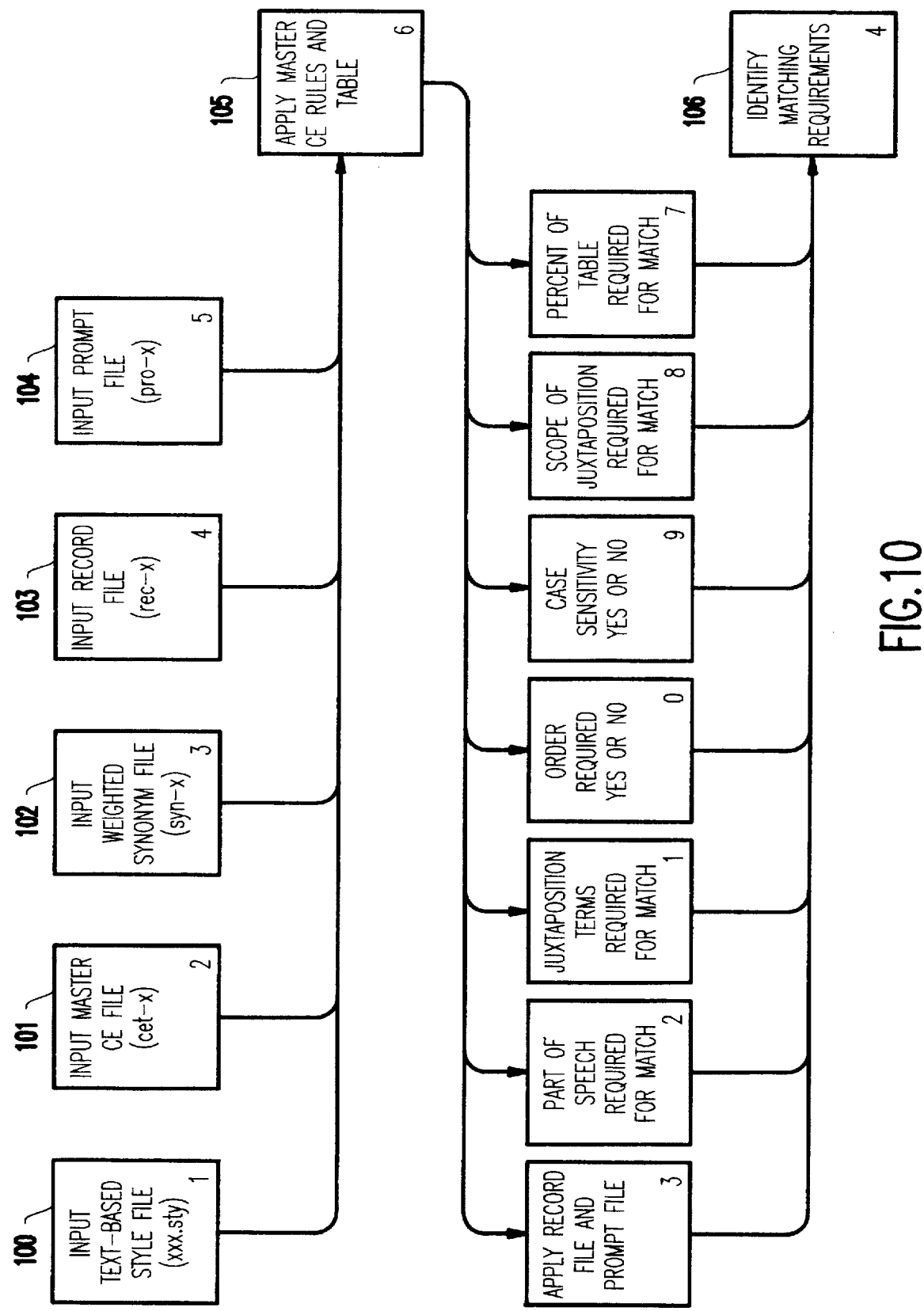
FIG. 10 is a flow diagram showing in more detail the construction of the semantic CE form.

As mentioned, the invention applies two CE forms in combination, semantic based CEs and syntactic-based CEs. The constructions of these are shown in more detail in FIGS. 10 and 11. Referring first to FIG. 10, the construction of the semantic CE form, which matches statements to categorize them on the basis of semantic rules and tables, is shown. The operator is provided with a set of five switches from which to select; input text-based style file 100 (xxx.sty), input master CE file 101 (cet-x), input weighted synonym file 102 (synx), input record file 103 (rec-x), and input prompt file 104 (pro-x). These five input files are prepared in advance by the operator. The switches selected establish the quantified conditions to be satisfied by the procedure 105 which applies master CE rules and tables. These include the part of speech (i.e., noun, verb, subject noun, object noun, etc.) for meaning and context, the degree of juxtaposition terms must possess, case sensitivity, order mandates, juxtaposition if designated by number of words or characters between terms, total percent of the terms in the designated table that must be in compliance with the other quantified conditions. The output of the procedure is an identification of matching statements 106.

Figure 11:
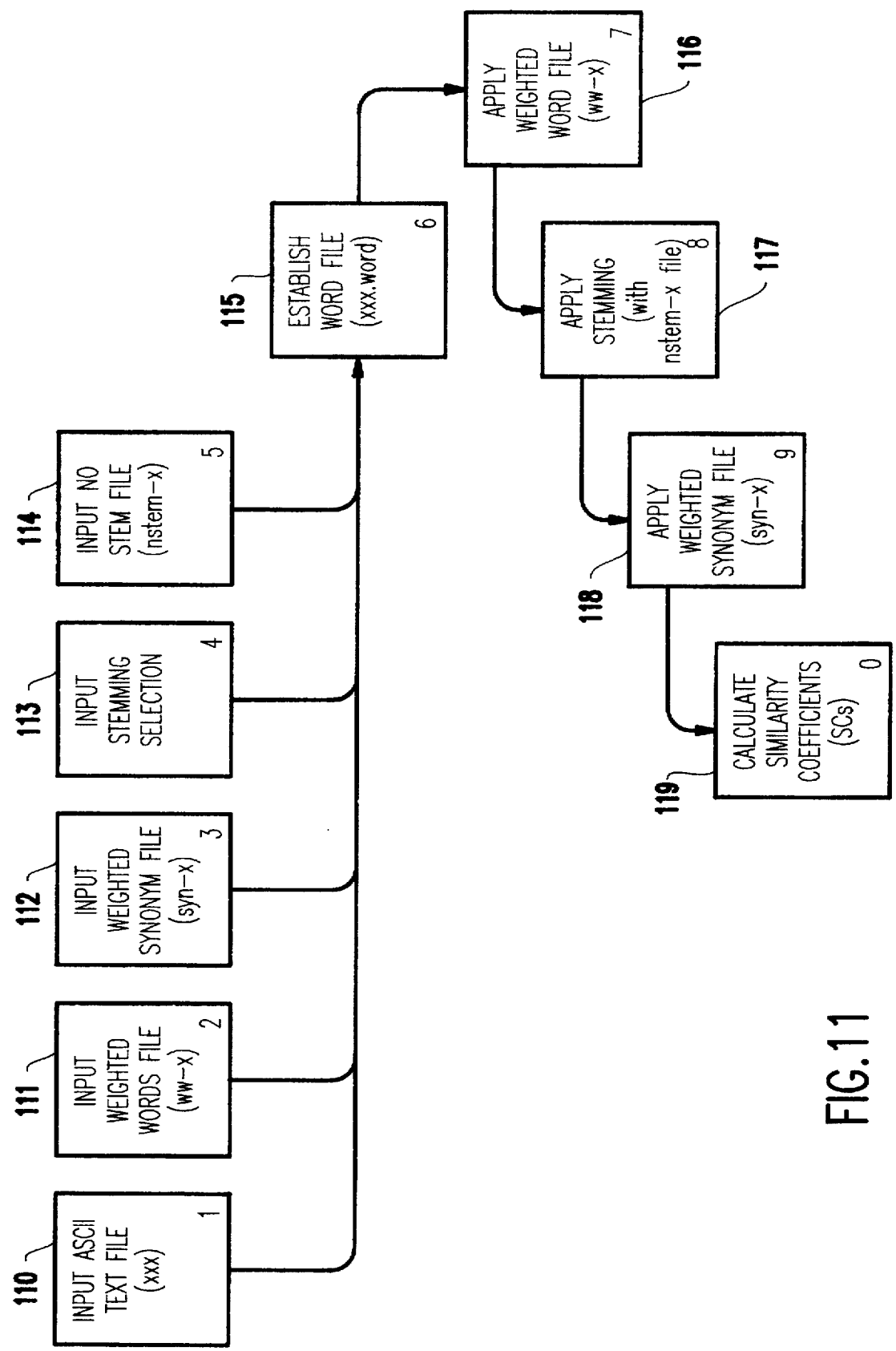
FIG. 11 is a flow diagram showing in more detail the construction of the syntactic CE form.

FIG. 11 shows the construction of the syntactic CE form, which identifies matching statements to categorize them on the basis of syntactic properties. Again, there are five switches which the operator may select, and these are used in the calculation of the similarity coefficients (SCs). The switches include the input ASCII file 110 (xxx), the input weighted words file 111 (xx-x), the input weighted synonym file 112 (syn-x), the input stemming selection 113, and the input no stem file 114 (nstem-x). These files are prepared by the operator in advance. There are five steps to the process. First, in step 115, a master vector is prepared for all words or terms (phrases delimited by a backlash are treated as a single term) in the document. Next, in step 116, the weighted word file is applied to eliminate words that have been assigned a zero (0.0) weight and to apply other weights other than the default of 1.0. In step 117, the designated stemming program is applied to stem all words to their basic root stem. An example is to remove plurals such as "ies" and plain "s". There are six variants of the stemming program, with increasing "severity" of the stemming. In some documents, the operator, by trial and error, recognizes that some stemming options pass a point of diminishing returns and introduce ambiguity due to unusual terms in the lexicon for that particular domain. In step 118, the weighted synonym file is applied to establish the weighted synonimity to be applied in the calculation of the presence or absence of matching words in pairs of statements. The synonym file is one of the most critical files for reasonable similarity measures as a given author or set of authors will apply numerous synonyms, or near synonyms, for very similar statements. Finally, in step 119, the similarity coefficients (SCs) are calculated. The calculation is the dot product or cosine between each pair of statements. This involves the product of the coefficient representing the common presence of a word in a given pair of statements as the numerator, with the square root of the product of the two individual products of all "present" words in each of the two statements. Thus, if all the words are the same (i.e., the words themselves or a 1.0 weighted synonym), the numerator will be equal to the denominator. If some terms are not common between the two statements, the denominator will be larger than the numerator. Thus, a similarity coefficient of 1.0 or less is always the result. The coefficient that is used to represent the presence of a word in a statements is the logarithm to the base two of the ratio of the number of statements as the numerator and the number of those statements in which that given word occurs. That ratio is always larger than 1.0. Further, in the case where a given word occurs in every statement, the ratio is exactly 1.0, and for that reason, the coefficient used is the logarithm of the ratio plus 1.0, to avoid the case where the logarithm would be 0.0; namely, when the ratio is 1.0.

Figure 12:
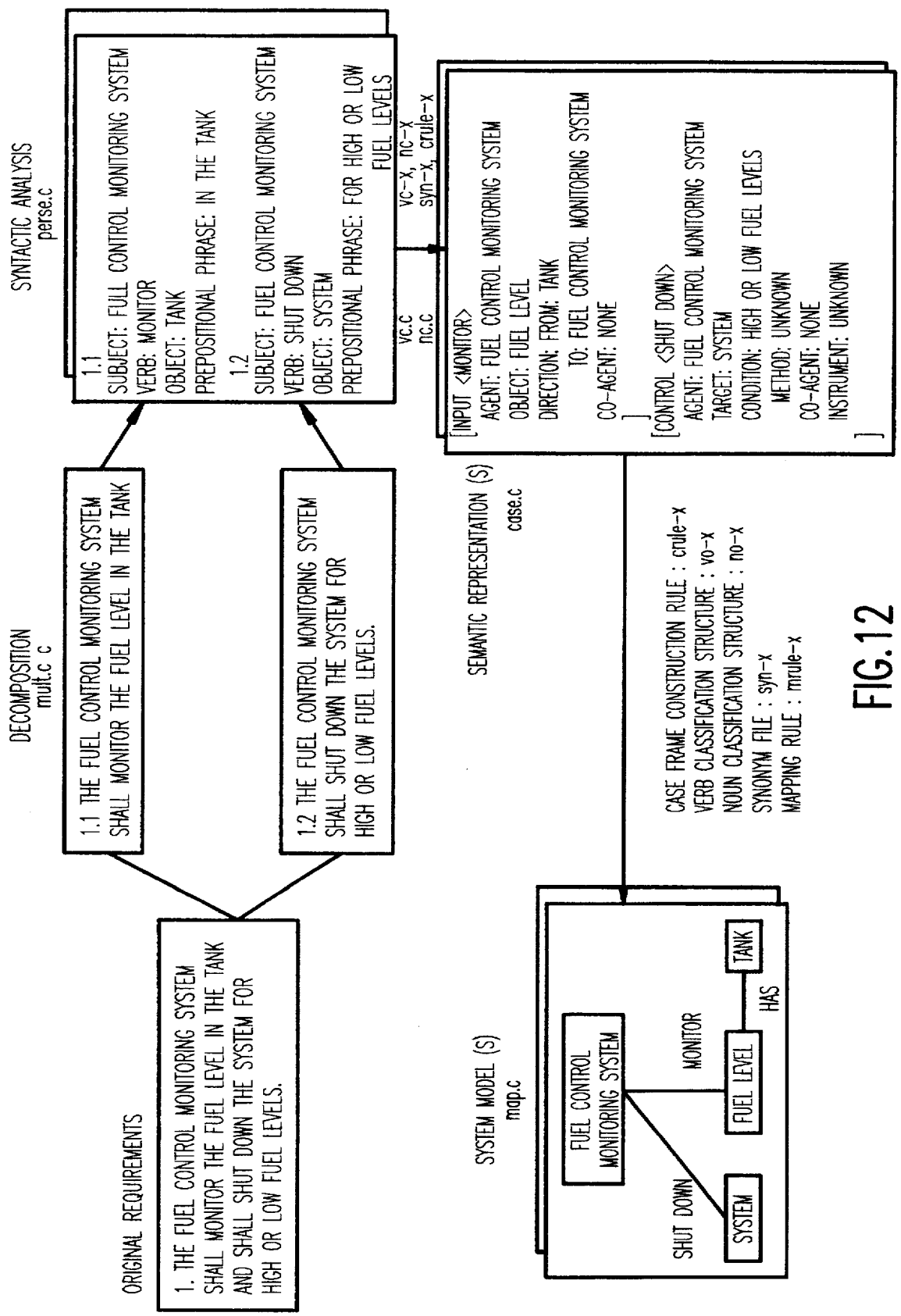
FIG. 12 is a data flow diagram showing an example of semantic representation and mapping to system models.
Figure 13:
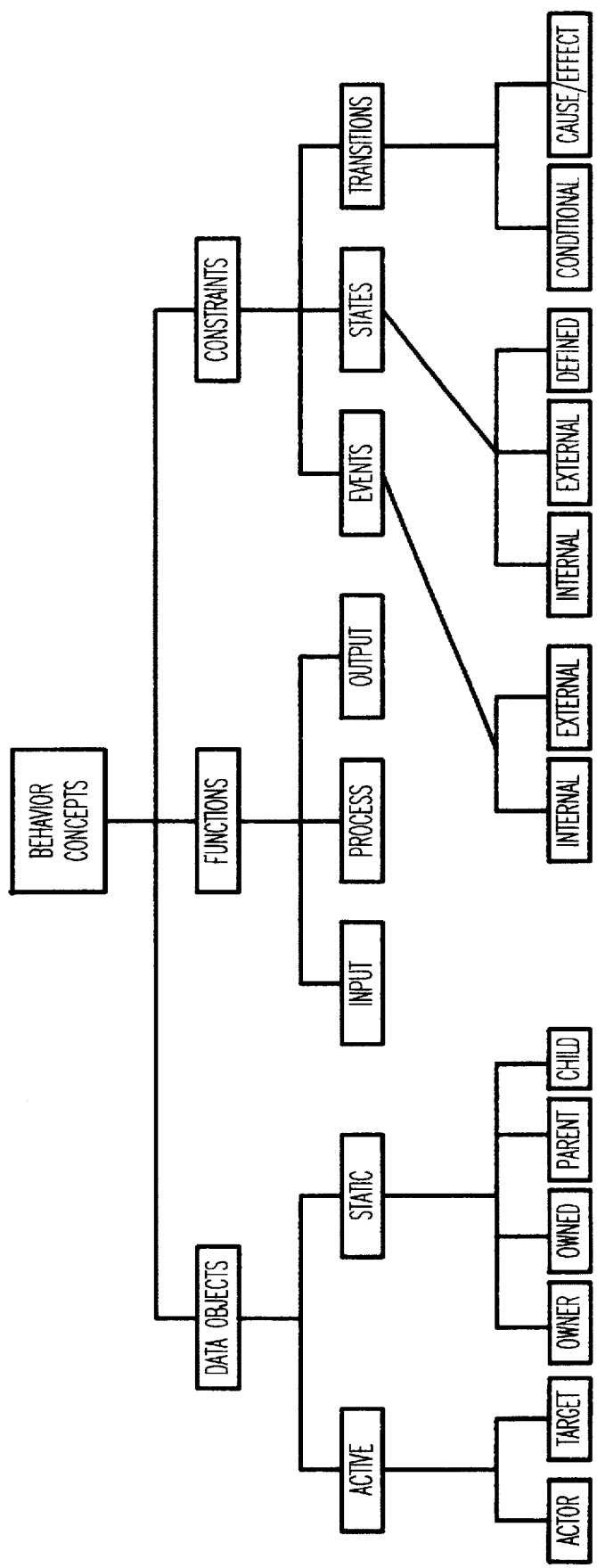
FIG. 13 is a hierarchal block diagram showing a sample semantic classification structure.
Figure 14:
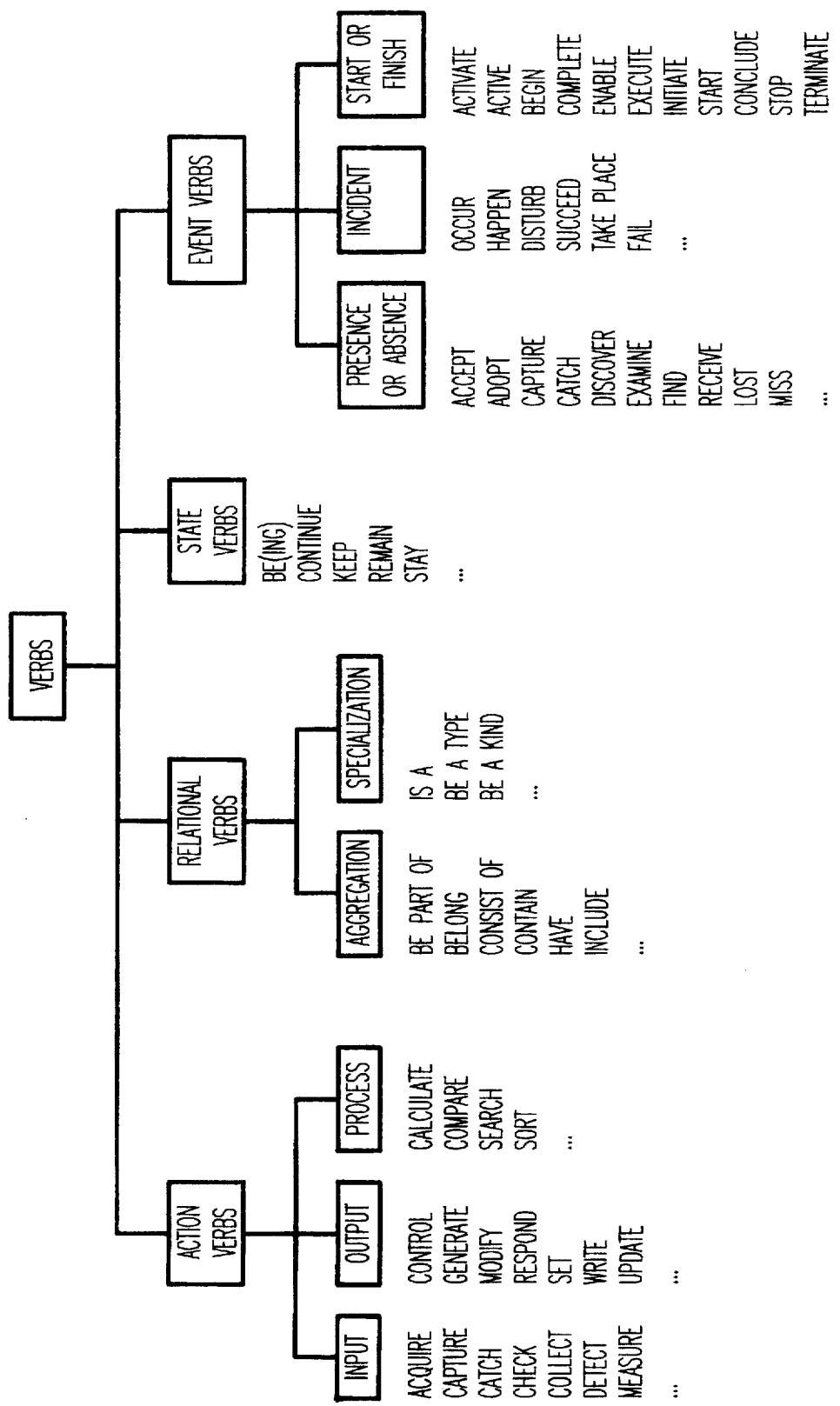
FIG. 14 is a hierarchal block diagram showing a sample verb classification structure and associated CE category tables.

As shown in FIG. 12, the AIRES system can be applied to support the identification of behavioral elements and their mapping to system model representations. The CE procedures (CEPs include decomposition from compound to simple sentences, syntactic analysis to establish syntactic characteristics such as parts of speech, semantic representation by the use of case frames and classifications structures, and then mapping to system models. Sample classification structures for behavioral concepts and verb categorizations for semantic mapping are respectively shown in FIGS. 13 and 14.

Figure 15:
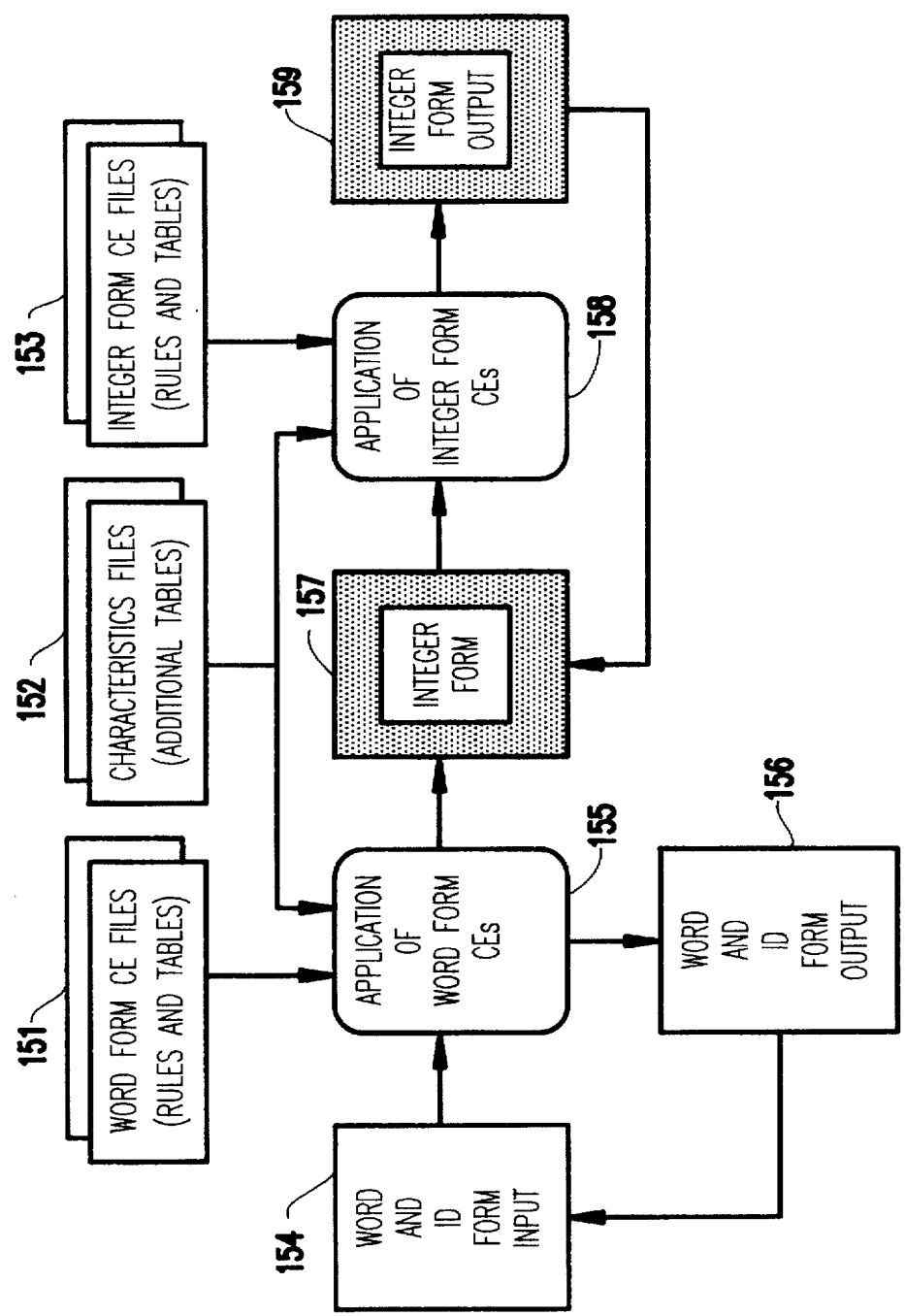
FIG. 15 is a block diagram showing the data flow of processing of the CE application module shown in FIG. 2.

The overall architecture of that application module 34 shown in FIG. 2 is depicted in FIG. 15, with the input files from the CE construction module 33 shown across the top and the left. These include the word form CE files 151 (rules and tables), characteristics files 152 (record files of various characteristics such as volatility), integer form CE files 153 (rules and tables), and the ID-word form statements input file 154. As shown in FIG. 15, application of word form CEs in method 155 results in outputs of two formats, an ID-word form file 156 and an integer form file 157. The ID-word form file 156 is in the same format (IDs, words, and parts of speech) as the statements input file, but it contains only the IDs and associated words and their parts of speech that satisfied the CEs. The integer form output file 157 is a list, with IDs, but without words or their parts of speech, of the CE filename and the associated IDs as they are found to be in the categories defined by the word form CEs. A sample of the integer form output file is provided in Table 2. The cew-1, -2, and -3 entries are the names of CEs. the "w" added to "ce" in the case distinguishes these as word form CEs.

TABLE 2

| cew- | IDs |
|---|---|
| cew-1 | 0001 0003 0011 |
| cew-2 | 0002 0018 |
| cew-3 | 0004 0013 0021 0037 |

The output of the second application process 158, the application of integer form CEs, is in an integer form output file 159 similar in format to that produced by the application of word form CEs; that is, a list of the IDs in the categories defined by the applied CE. In addition, this application module 158 includes processes for sorting and selecting IDs based on the category code (cc) that was assigned for each CE. As indicated in FIG. 2, the output of module 34 is output assessment formats 36 which are used in the transformation process 16.

Figure 16:
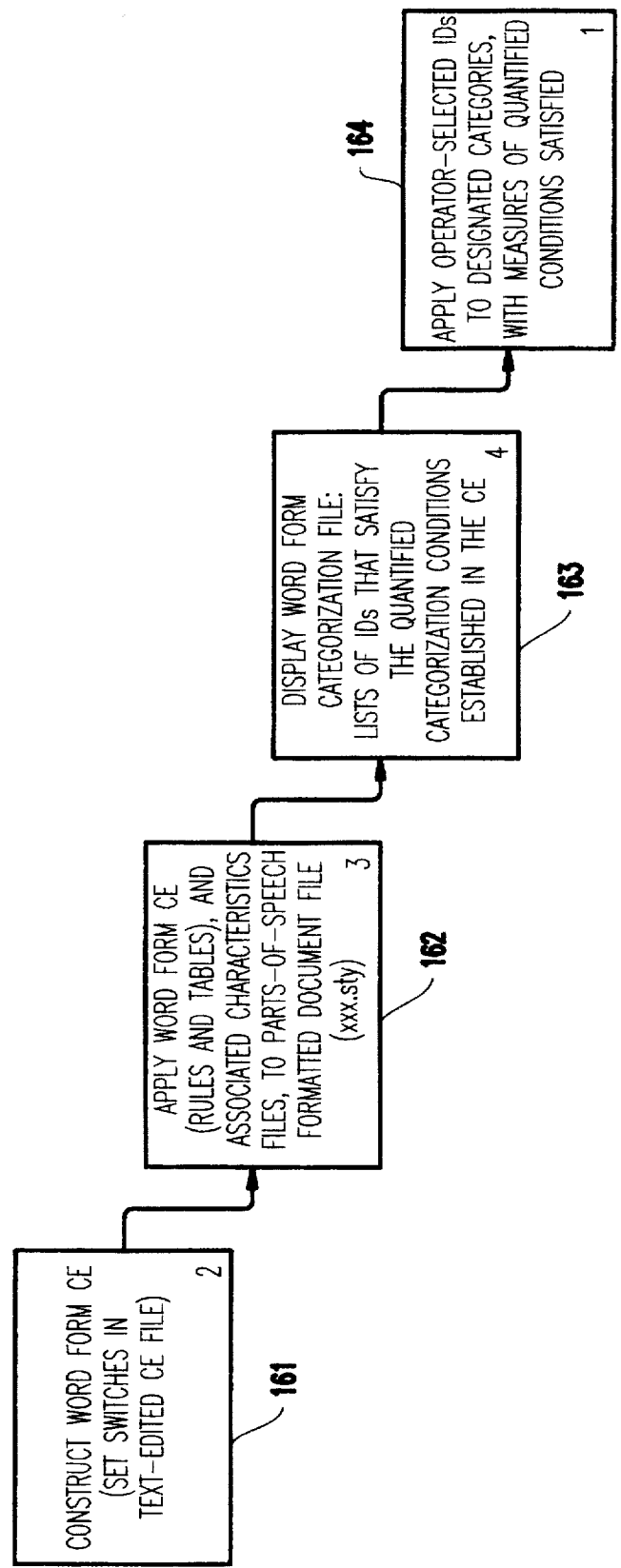
FIG. 16 is a flow diagram showing in more detail the logic of the application of word form CEs shown in FIG. 15.

FIG. 16 shows a flow diagram showing the logic of the application word form CEs 155 in FIG. 15. The word form CE is constructed in function block 161. This is performed in response to the operator setting switches in the text-edited CE file using an appropriate panel. Next, in function block 162, the word form CE is applied, using rules and tables and associated characteristics files, to parts-of-speech formatted document file (xxx.sty). The word form categorization file is displayed in function block 163. This comprises lists of IDs that satisfy the quantified categorization conditions established in the CE. Finally, in function block 164, the operator-selected IDs are applied to designated categories with measures of quantified conditions satisfied.

Figure 17:
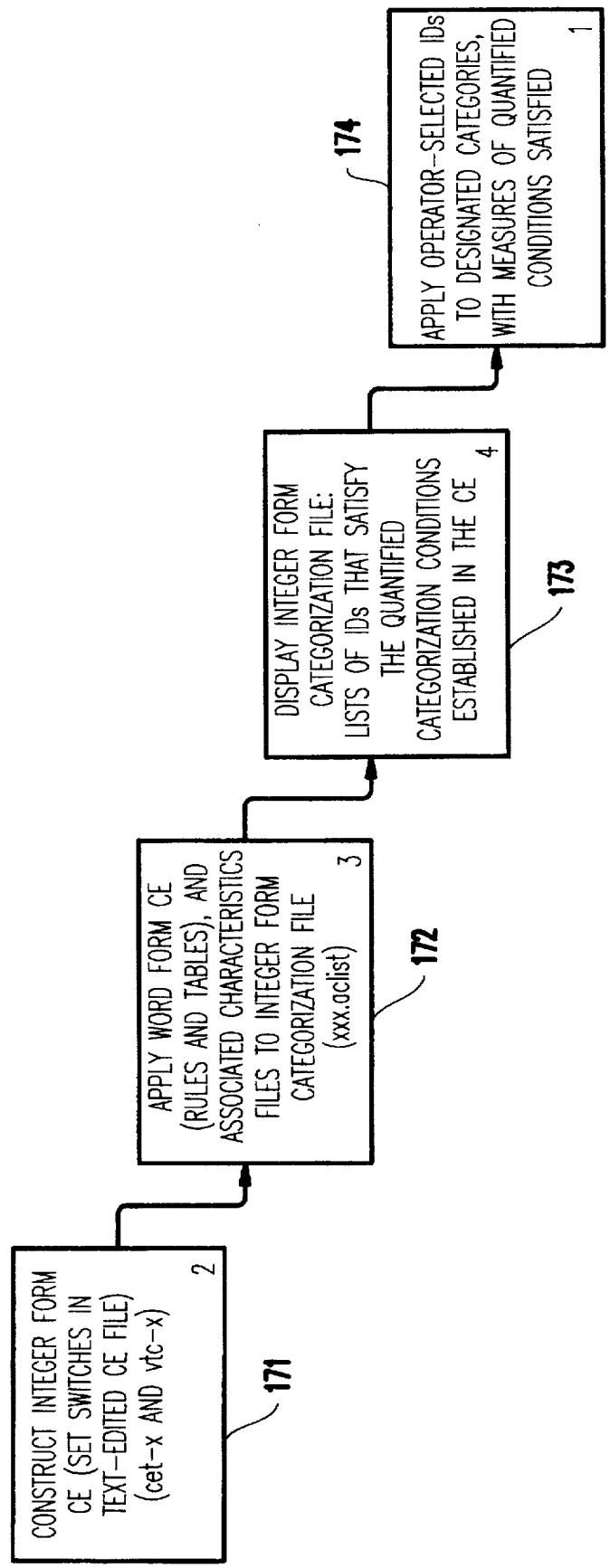
FIG. 17 is a flow diagram showing in more detail the logic of the application of integer form CEs shown in FIG. 15.

FIG. 17 shows a flow diagram showing the logic of the application integer form CEs 158 in FIG. 15. The integer form CE is constructed in function block 171. This is performed in response to the operator setting switches in the text-edited CE file using an appropriate panel. Next, in function block 172, the integer form CE is applied, using rules and tables and associated characteristics files, to the integer form categorization file (xxx.aclist). The integer form categorization file is displayed in function block 173. This comprises lists of IDs that satisfy the quantified categorization conditions established in the CE. Finally, in function block 174, the operator-selected IDs are applied to designated categories with measures of quantified conditions satisfied.

The invention is a user interactive process. This process is facilitated by operator panels displayed on a computer display screen. There are two types of operator panels; menu panels and execution panels. The basic menu panel is shown in FIG. 18. This menu panel allows the operator to select from among the four modules of the AIRES CEBRA assessment framework shown in FIG. 2 relating to formatting, characterization, CE construction, and CE application. Selection may be made by keyboard by inputting the select code (i.e., 00, 01, 02, or 03) and pressing the enter key or by a pointing device, such as cursor controlled by a mouse or trackball, by placing the cursor over a display button and pressing a button on the mouse. Alternatively, if the computer system is equipped with a touch screen, selection may be made by touching the desired module selection button displayed on the screen.

Selection of a module from the basic screen shown in FIG. 18 may cause another menu panel to be displayed, if there are options to be selected by the user, or an execution panel to be displayed. FIG. 19 provides one example of an operator execution panel, this particular panel being displayed as a result of the user selecting the formatting option in the menu panel of FIG. 18. The panel shown in FIG. 19 is again designed to receive user input from a keyboard and a pointing device, such as a cursor controlled by a mouse or trackball, or, in the case of a touch screen display, the user's touch. The panel includes a title bar 191, inputs 192, run buttons 193, outputs 194, and utility buttons 195. The title bar 191 is at the top of the panel and includes the panel number and description. The input files are placed on the far left and have, as the first file 196 from the top, the statement input file. Each input file line is accompanied by a set of selection rectangles 197 (that are mutually exclusive in their selection) for selecting input files to show. Show is effected by first selecting the file rectangle and then the show button 198 above the rectangle set. The file is displayed in a window 199 at the bottom of the panel. Run buttons 193 are elliptic and are labeled run with the name of the program being executed. When programs have multiple modes, the selections for the program are included below the input files and to the left of the run buttons. Other parameter values and run options are included in proximity to the run buttons. The format for outputs 194, with an associated show button 201, is similar to that for the inputs. Outputs are typically in the upper right of each execution panel, as Inputs are in the upper left. Three small utility buttons 195 for general operator support are also provided. These are an "H" button for help, an "R" button for registry, and an "I" button for index.

Figure 22:
FIG. 22 is a facsimile of a computer display screen showing an example of an execution panel presented to the operator as one of the options when the second option of the submenu shown in FIG. 20 is selected.

FIG. 20 shows in example of a submenu which is displayed as a result of the operator choosing characterization option from the menu shown in FIG. 18. The operator is given three options in the submenu shown in FIG. 20, these being syntactic characterization and relative sizing, term characterization and ID similarity coefficients (SCs) and comparisons. If, for example, the operator selects the first of these options, syntactic characterization and relative sizing, a further submenu is displayed offering the operator with additional options. The execution panel shown in FIG. 21 is displayed as a result of selecting one of those options. It will be observed that in window 211 there is displayed the syntax of the analyzed English language text shown in window 119 of FIG. 19. If the operator selects the second of the options in the menu shown in FIG. 20, that is, term characterization and ID similarity coefficients (SCs), the operator will be presented with yet another submenu with additional options. The execution panel shown in FIG. 22 is displayed as a result of selecting one of those options. In this case, the window 221 displays the term allocation and ID similarity coefficients (SCs). If the operator selects the third of the options in the menu shown in FIG. 20, that is, comparisons, the operator will be presented with still another submenu with additional options. The execution menu shown in FIG. 23 is displayed as a result of selecting one of those options. In this case, the window 231 displays file comparisons based on syntactic elements.

The module 33 to construct CEs shown in FIG. 2 is implemented with a series of panels similarly to the implementation of modules 31, format statements, and 32, establish statement characteristics, described above. That is, in response to selecting the third option, CE construction, from the menu shown in FIG. 18, a submenu will be displayed providing the operator with several options. The selection of one of these will result in the display of the execution panel shown in FIG. 24. In this case, the window 241 displays the text originally displayed in window 199 of FIG. 19.

Figure 28:
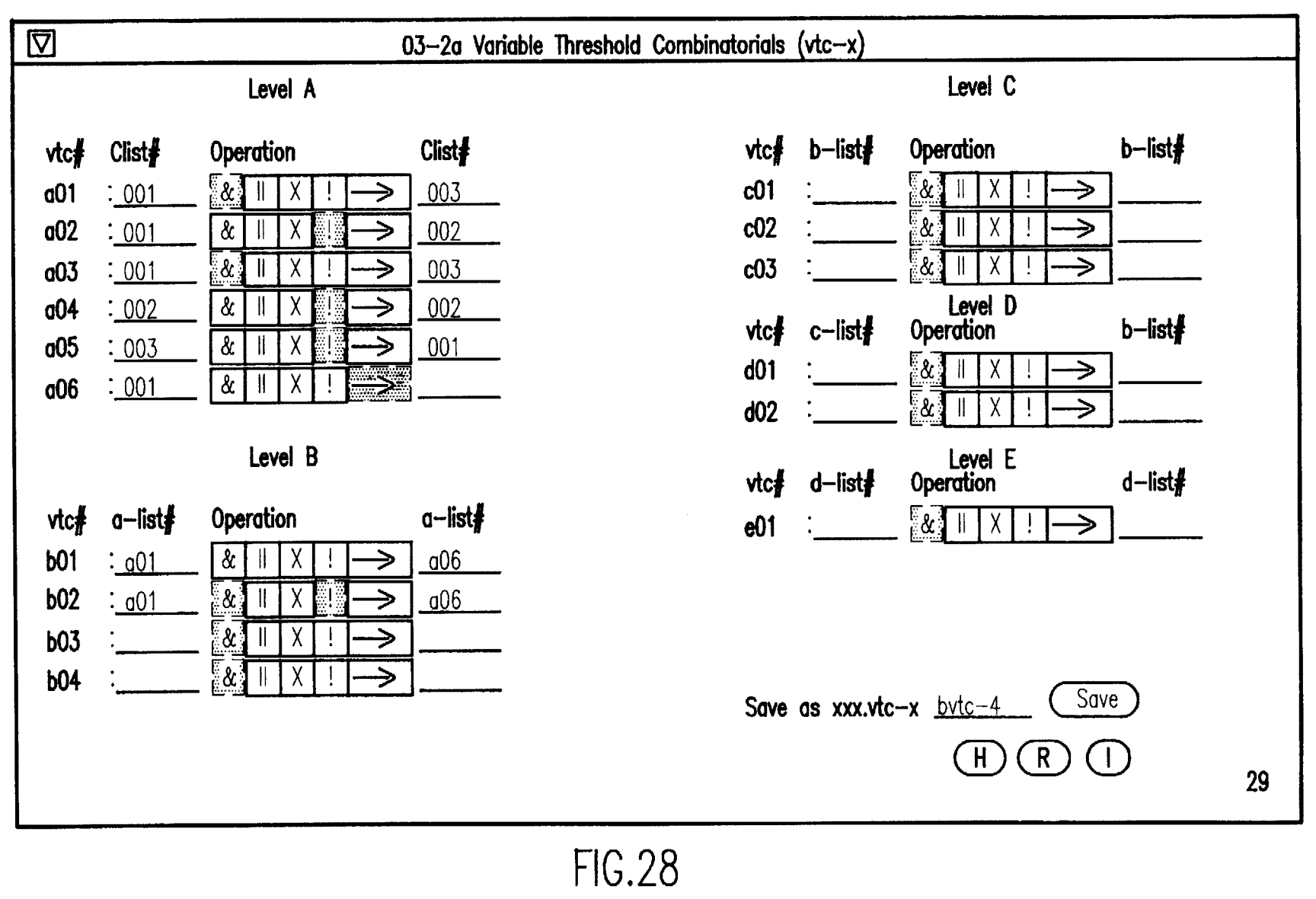
Figure 29:
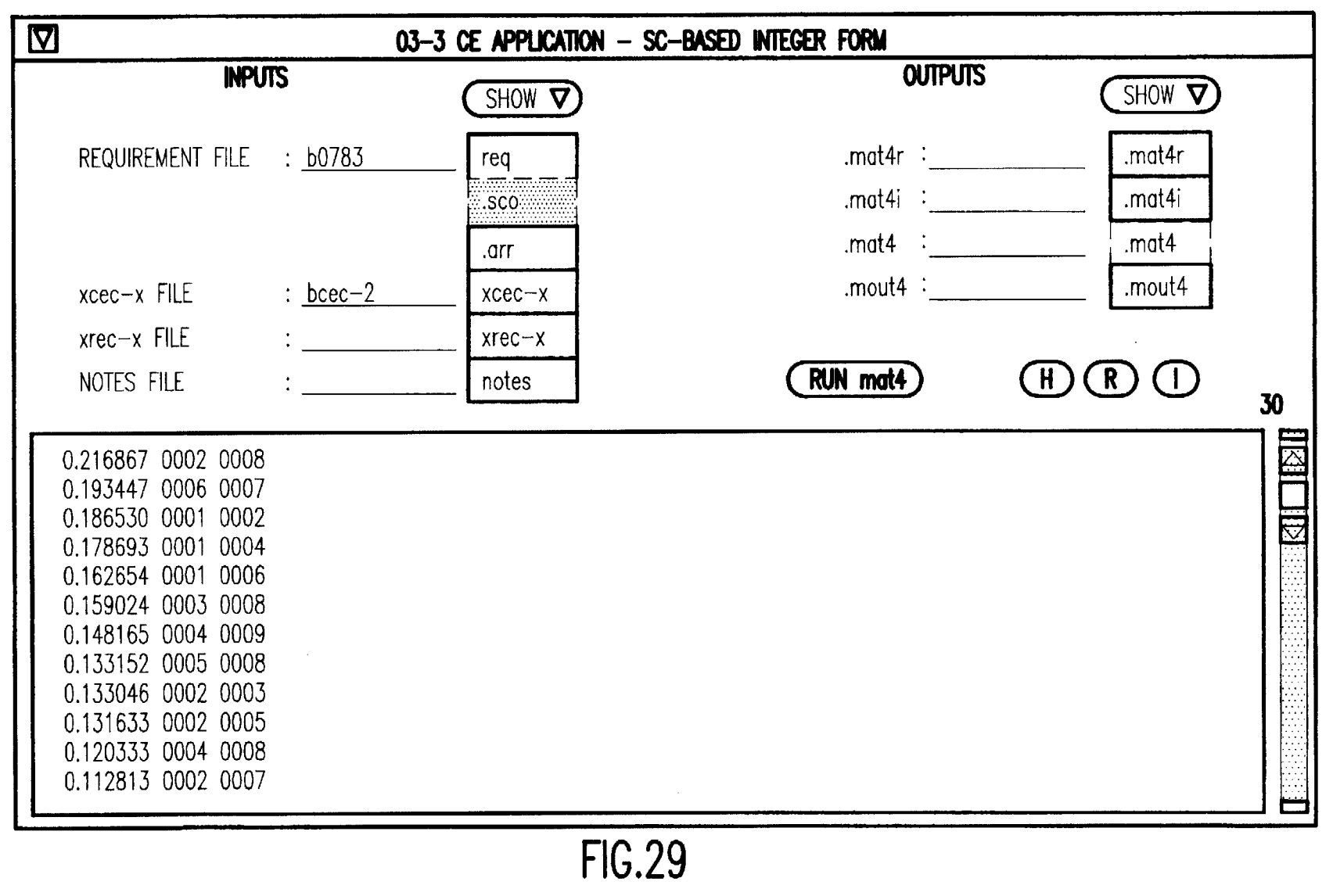

The next series of panels illustrate by way of example the implementation of the module 34 to apply CEs shown in FIG. 2. When the fourth option, CE application and assessment, is selected from the menu shown in FIG. 18, the submenu shown in FIG. 25 is displayed. Selecting the first option, CE application—word form, of this submenu results in the display of the execution panel shown in FIG. 26. Selection of the second option, CE application—ID-based integer form, results in the display of the execution panel shown in FIG. 27. If the build VTC button shown in FIG. 27 is selected, the panel shown in FIG. 28 is displayed. This panel provides the operator with options for the variable threshold combinatorials (VTCs) using AND (&), OR (||), Exclusive OR (X), and NOT (!) Boolean operations. Returning to FIG. 25, selecting the third option, CE application—SC-based integer form, results in the display of the execution panel shown in FIG. 29.

The display screen panels shown in FIGS. 18 to 29 are not inclusive of all such panels as implemented in the preferred embodiment of the invention. These panels, however, amply demonstrate by way of examples a specific implementation of the invention. One skilled in the art, based on the flow diagrams and these exemplary panels, can readily write source code to practice the invention. One skilled in the art will also recognize that the invention can be practiced with other and different user interactive panels than those provided by way of example. Thus, it will be appreciated that the invention can be practiced with modification within the spirit and scope of the appended claims.

Having thus described our invention, what we claim as new and desire to secure by Letters Patent is as follows:

1. A user-interactive computer-aided English text categorization method that supports the use of quantified conditions and implemented on a computer having a computer user interface for prompting and receiving user selections and inputs, said method comprising the steps of:

accepting input as English language text, formatting the text for subsequent processing, and assigning identifications (IDs) to sets of the input English language text;

establishing the characteristics of a complete set of text as the basis for the quantifiable conditions, the characteristics including co-occurring terms, pair-wise syntactic similarity coefficients (SCs), combinations of parts of speech;

constructing interactively with prompted operator input classification ectypes (CEs) as text-edited rules and tables to specify the quantified conditions for representation of a category within a classification structure, said CEs being of two forms, word form and integer form CEs, said word form CEs being based on a list of designated words from the input English language text, said integer form CEs being of two types, ID-based and SC-based, ID-based CEs supporting logical operations as a basis for categorizing statements and SC-based CEs using the pair-wise SCs between statements; and applying constructed CEs to prepare lists of candidates for each category.

2. The user interactive computer aided engineering statements method recited in claim 1 wherein the step of establishing statements characteristics comprises the steps of:

applying a weighted words file to the English language text to de-emphasize or eliminate words in the English language text;

preparation of a master vector of all words or terms remaining in the English language text;

applying weighted files of synonyms, parts-of-speech, and uses relationships to the English language text to apply weighted values for these relationships;

applying operator-selected stemming operations to reduce terms to their basic roots; and identifying parts of speech and combinations of parts of speech meaning and context, including subject nouns and subject noun phrases, verbs, verb phrases, and subject noun coupled with verb phrases.

3. The user interactive computer aided engineering statements method recited in claim 2 wherein the step of establishing statements characteristics further comprises the step of calculating similarity coefficients (SCs) as a dot product or cosine between each pair of statements.

4. The user interactive computer aided engineering statements method recited in claim 1 wherein the step of constructing CEs includes constructing word form CEs by prompting a user to select among a plurality of files, each of said files establishing quantified conditions to be satisfied including, part of speech, order, synonym and other relationships, tables of conditions such as date of change, degree of juxtaposition of terms, and case sensitivity.

5. The user interactive computer aided engineering statements method recited in claim 1 wherein the step of applying CEs comprises the steps of:

receiving word form CE files and integer form CE files in the form of rules and tables and receiving characteristics files as additional tables generated by said steps of establishing statements characteristics and constructing CEs;

applying the rules and tables of the word form CE files together with additional tables of the characteristics files to generate a word and ID form output in categories defined by applied CEs;

applying the rules and tables of the integer form CE files together with additional tables of the characteristics files and the word and ID form output to generate an integer form output; and applying, as quantified conditions in variable threshold combinatorials (VTCs) combinations of the members of sub-categories of the text.

* * * * *